United States Patent
Agüero Trejo et al.

(10) Patent No.: US 11,526,330 B1
(45) Date of Patent: Dec. 13, 2022

(54) UNIVERSAL INTERFEROMETER AND SYSTEMS AND METHODS FOR UNIVERSAL THREE-DIMENSIONAL QUANTUM RANDOM NUMBER GENERATION

(71) Applicant: Tuatara QRNG, LLC, Bethesda, MD (US)

(72) Inventors: José Manuel Agüero Trejo, Morelos (MX); Edward H. Allen, Bethesda, MD (US); Cristian S. Calude, Auckland (NZ)

(73) Assignee: Tuatara QRNG, LLC, Bethesda, MD (US)

( * ) Notice: Subject to any disclaimer, the term of this patent is extended or adjusted under 35 U.S.C. 154(b) by 0 days.

(21) Appl. No.: 17/696,595

(22) Filed: Mar. 16, 2022

(51) Int. Cl.
*G06F 7/58* (2006.01)
*G06N 10/60* (2022.01)

(52) U.S. Cl.
CPC .............. *G06F 7/58* (2013.01); *G06N 10/60* (2022.01)

(58) Field of Classification Search
CPC ........................................................ G06F 7/58
See application file for complete search history.

(56) References Cited

U.S. PATENT DOCUMENTS

| | | | |
|---|---|---|---|
| 9,218,160 B2 | 12/2015 | Pruneri et al. | |
| 9,423,819 B2 | 10/2016 | Marandi et al. | |
| 10,540,146 B1 | 1/2020 | Vakili | |
| 10,802,800 B1 | 10/2020 | Vakili | |
| 2016/0328211 A1 | 11/2016 | Nordholt et al. | |
| 2021/0141609 A1* | 5/2021 | Huang | G06F 7/588 |

FOREIGN PATENT DOCUMENTS

| | | |
|---|---|---|
| CN | 109375898 | 2/2019 |
| JP | 2015-215888 | 12/2015 |
| WO | 2019006039 | 1/2019 |

OTHER PUBLICATIONS

A. A. Abbott, C. S. Calude, J. Conder, and K. Svozil. Strong Kochen-Specker theorem and incomputability of quantum randomness. Physical Review A, 86(062109), Dec. 2012.

(Continued)

*Primary Examiner* — Michael D. Yaary
(74) *Attorney, Agent, or Firm* — Terry M. Sanks, Esq.; Beusse Sanks, PLLC

(57) ABSTRACT

A universal interferometer for a three-dimensional quantum random number generator (3D QRNG) that includes three input ports. Each input port being configured to receive at least one prepared photon having three dimensions of quantum information in Hilbert space from a preparation stage of the 3D QRNG. The prepared photon is prepared based on a selected probability distribution set selected from probability distribution sets of p1, p2 and p3 that add to 1 and where the p1, the p2 and the p3 are rational numbers less than 1 and greater than zero. The universal interferometer includes three two-dimensional interferometers connected and arranged to measure along an x-axis of a Cartesian coordinate system the prepared photon and preserving the three dimensions of the quantum information of the measured photon. The universal interferometer includes three output ports which produces the measured photon corresponding to a three-dimensional eigenstate.

20 Claims, 11 Drawing Sheets

(56) References Cited

OTHER PUBLICATIONS

A.A. Abbot, C. S. Caluade, M. J. Dinneen, R. Hua. A hybrid quantum-classical paradigm to mitigate the embedding costs in quantum annealing. Int. J. Quantum Inform., Oct. 14, 2019.

A. A. Abbott, C. S. Calude, and K. Svozil. A non-probabilistic model of relativised predictability in physics. Information, 6(4):773-789, 2015.

A. A. Abbott, C. S. Calude, and K. Svozil. A variant of the Kochen-Specker theorem localising value indefiniteness. Journal of Mathematical Physics, 56, 102201, http://dx.doi.org/10.1063/1.4931658, Oct. 2015.

J. M. Aguero Trejo and C. S. Calude. A new quantum random number generator certified by value indefiniteness. Theoretical Computer Science, 862:3-13, Mar. 2021 https://linkinghub.elsevier.com/retrieve/pii/S0304397520304679.

C. S. Calude. Information and Randomness—An Algorithmic Perspective. Texts in Theoretical Computer Science. An EATCS Series. Springer, 2002.

C. S. Calude, K. Frilya Celine, Z. Gao, S. Jain, L. Staiger, and F. Stephan. Bi-immunity over different size alphabets. Theoretical Computer Science, 2021, https://doi.org/10.1016/j.tcs.2021.09.005.

M. M. Jacak, P. Jozwiak, J. Niemczuk, and J. E. Jacak. Quantum generators of random numbers. Scientific Reports, 11(1):16108, 2021.

J. Markoff. Flaw found in an online encryption method, https://www.nytimes.com/2012/02/15/technology/researchers-find-flaw-in-an-online-encryption-method.html.

"Quantis QRNG Chip," by ID Quantique (IDQ), copyright Mar. 2020.

P. B. R. Nisbet-Jones, J. Dilley, A. Holleczek, O. Barter and A. Kuhn. Photonic qubits, qutrits and ququads accurately prepared and delivered on demand, New Journal of Physics 15 (2013) 053007 (11pp), doi:10.1088/1367-2630/15/5/053007.).

A. A. Abbott, C. S. Calude, M. J. Dinneen, and N. Huang. Experimentally probing the algorithmic randomness and incomputability of quantum randomness. Physica Scripta, 94(4):045103, Feb. 2019.

S. Oh and S. Kais. Non-randomness of Google's quantum supremacy benchmark, 2021, https://arxiv.org/abs/2110.06046.

A. A. Abbott, C. S. Calude, and K. Svozil. On the unpredictability of in- dividual quantum measurement outcomes, in Fields of Logic and Computation II, vol. 9300 of Lecture Notes in Computer Science, pp. 69-86, Springer, 2015. L. D. Beklemishev, A. Blass, N. Dershowitz, B. Finkbeiner, and W. Schulte, editors.

\* cited by examiner

650

652 — Receiving photons on at least one of three input ports of a universal interferometer, each input port configured to receive a corresponding prepared photon having three dimensions of quantum information in Hilbert space from a preparation stage of the 3D QRNG, each corresponding prepared photon is prepared based on a selected probability distribution set selected from probability distribution sets of p1, p2 and p3 that add to 1 and where the p1, the p2 and the p3 are rational numbers less than 1 and greater than zero

654 — Measuring, by three two-dimensional (2D) interferometers of the universal interferometer, along an x-axis of a Cartesian coordinate standard system the prepared photon and preserving the three dimensions of the quantum information in the Hilbert space of the measured photon

656 — Producing at one output port of three output ports of the universal interferometer a measured photon corresponding to a three-dimensional eigenstate

FIG. 6B

UNIVERSAL INTERFEROMETER AND SYSTEMS AND METHODS FOR UNIVERSAL THREE-DIMENSIONAL QUANTUM RANDOM NUMBER GENERATION

BACKGROUND

The field of invention pertains to the generation of random numbers by means of a process described by a quantum mechanical system and, more particularly, to a universal interferometer and systems and methods for universal three-dimensional quantum random number generation using the universal interferometer.

Random numbers are a valuable resource for a wide range of scientific applications. Random numbers can be written by their expansion in an integer base; the binary expansion of a real number, consisting of a sequence of zeroes and ones, is commonly used. A number is said to be truly random if the sequence of numbers in its integer base expansion has no patterns. It has been proved that patterns emerge in any large enough structure, thus, true randomness is a mathematical impossibility. For this reason, the quality of randomness of a number is commonly assessed by batteries of algorithmic and statistical tests designed to probe the aforesaid number ability to satisfy, to some extent, a certain set of properties that describe diverse symptoms of randomness including, but not limited to, unpredictability, incomputability, incompressibility and Borel normality.

Deterministic algorithms designed to simulate randomness, denoted pseudo-random number generators, have been the main source of randomness for a long time. However, the quality of randomness of numbers generated in this manner is low since they are inherently computable. The need for a higher quality of randomness than the quality achievable by deterministic means has driven a surge in developing random number generators believed to be capable of producing a better quality of random numbers.

Quantum mechanics offers a mathematical framework that enables us to describe processes that cannot be attributed to deterministic mechanisms expressed in the form of hidden variables, and thus are believed to be fundamentally random. Quantum random number generators produce random numbers by exploiting such processes.

In 1964, physicist John Bell, established a test based on inequalities to verify that, under certain conditions, quantum mechanical predictions cannot be reproduced by statistical models of hidden variables. Based on Bell's results, several Bell-type tests and inequalities have been formulated over time upon which relies the widespread belief that measurements of certain fundamental quantum mechanical processes yield unpredictable results as a consequence of violating the conditions imposed by these results. Thus, several quantum random number generation protocols, and their embodiment in tangible systems, use Bell-type inequalities to certify the quality randomness of their outcomes. However, due to their purely statistical nature, violation of Bell-type inequalities only indicates non-classical correlations and does not require the Hilbert-space structure necessary to guarantee strong incomputability, an indispensable property to demonstrate an advantage over any deterministic random number generator.

Therefore, there is a need for an improvement of unpredictability of the outcomes over existing random number generators.

SUMMARY

Embodiments relate to a universal interferometer to preserve three dimensions of quantum information in Hilbert space of a prepared photon. The embodiments include systems and methods for generation of random numbers by means of a process described by a quantum mechanical system expressed by a quantum random number generation protocol certified by value indefiniteness.

An aspect of the embodiments includes a universal interferometer for a three-dimensional quantum random number generator (3D QRNG) that includes three input ports. Each input port being configured to receive at least one prepared photon having three dimensions of quantum information in Hilbert space from a preparation stage of the 3D QRNG. The prepared photon is prepared based on a selected probability distribution set selected from probability distribution sets of p1, p2 and p3 that add to 1 and where the p1, the p2 and the p3 are rational numbers less than 1 and greater than zero. The universal interferometer includes three two-dimensional interferometers connected and arranged to measure along an x-axis of a Cartesian coordinate system the prepared photon and preserving the three dimensions of the quantum information of the Hilbert space of the measured photon. The universal interferometer includes three output ports which produces the measured photon corresponding to a three-dimensional eigenstate.

An aspect of the embodiments includes a method for measuring a photon by a universal interferometer for a three-dimensional quantum random number generator (3D QRNG). The method includes receiving photons on at least one of three input ports of a universal interferometer. Each input port being configured to receive a corresponding prepared photon having three dimensions of quantum information in Hilbert space from a preparation stage of the 3D QRNG. Each corresponding prepared photon is prepared based on a selected probability distribution set selected from probability distribution sets of p1, p2 and p3 that add to 1 and where the p1, the p2 and the p3 are rational numbers less than 1 and greater than zero. The method includes measuring, by three two-dimensional (2D) interferometers of the universal interferometer, along an x-axis of a Cartesian coordinate standard system the prepared photon and preserving three dimensions of quantum information in the Hilbert space of the measured photon. The method includes producing at one output port of three output ports of the universal interferometer the measured photon corresponding to a three-dimensional eigenstate.

An aspect of the embodiments includes a three-dimensional quantum random number generator (3D QRNG). The 3D QRNG comprises a universal interferometer.

BRIEF DESCRIPTION OF THE DRAWINGS

A more particular description briefly stated above will be rendered by reference to specific embodiments thereof that are illustrated in the appended drawings. Understanding that these drawings depict only typical embodiments and are not therefore to be considered to be limiting of its scope, the embodiments will be described and explained with additional specificity and detail through the use of the accompanying drawings in which:

FIG. 6B illustrates a flowchart of a method for measuring a prepared photon of a 3D quantum random number generator;

DETAILED DESCRIPTION

Figure 1:
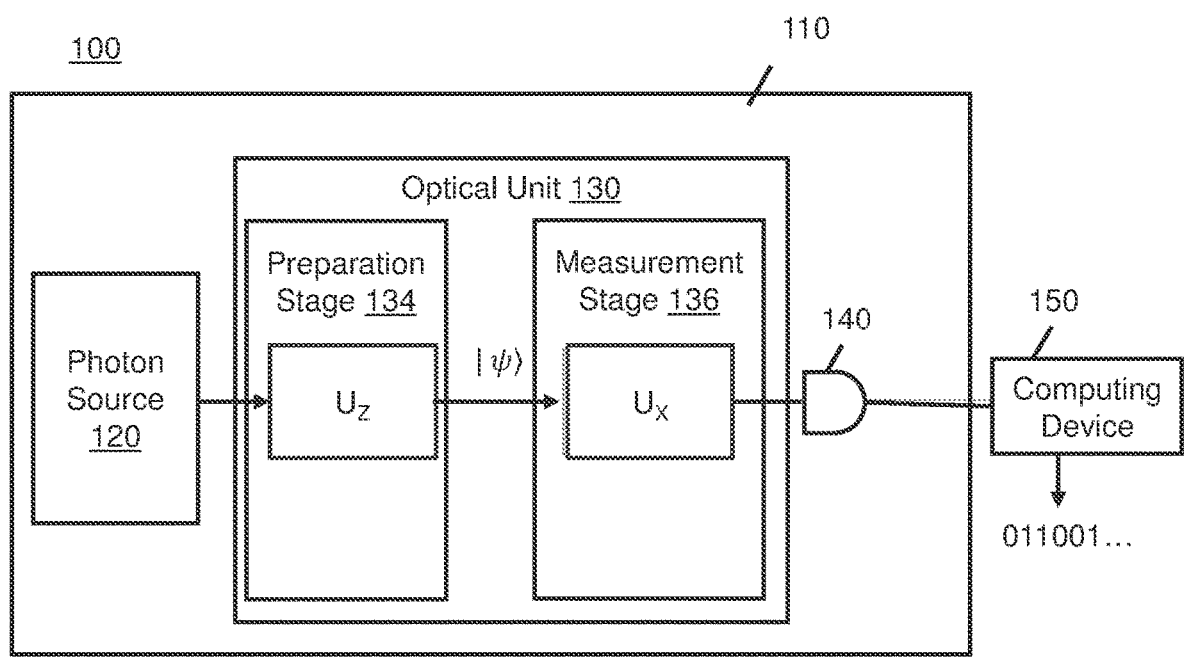
FIG. 1 illustrates a block diagram of a key generator system using universal three-dimensional (3D) quantum random number generator.

Embodiments are described herein with reference to the attached figures wherein like reference numerals are used throughout the figures to designate similar or equivalent elements. The figures are not drawn to scale and they are provided merely to illustrate aspects disclosed herein. Several disclosed aspects are described below with reference to non-limiting example applications for illustration. It should be understood that numerous specific details, relationships, and methods are set forth to provide a full understanding of the embodiments disclosed herein. One having ordinary skill in the relevant art, however, will readily recognize that the disclosed embodiments can be practiced without one or more of the specific details or with other methods. In other instances, well-known structures or operations are not shown in detail to avoid obscuring aspects disclosed herein. The embodiments are not limited by the illustrated ordering of acts or events, as some acts may occur in different orders and/or concurrently with other acts or events. Furthermore, not all illustrated acts or events are required to implement a methodology in accordance with the embodiments.

Notwithstanding that the numerical ranges and parameters setting forth the broad scope are approximations, the numerical values set forth in specific non-limiting examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 4.

In the embodiments, the quantum random number generator (QRNG) is a three-dimensional (3D) QRNG. The universal interferometer of the 3D QRNG is universal for all the probability sets $\{p1, p2, p3\}$, where p1, p2 and p3 are rational numbers less than 1 and greater than zero and which p1, p2 and p3 add to 1.

In some embodiments, the universal interferometer of the QRNG is universal for the probability sets $\{p1, p2, p3\}$, where the probability sets $\{p1, p2, p3\}$ are one of $\{1/3, 1/3, 1/3\}$ and $\{1/4, 1/2, 1/4\}$.

In some embodiments, a key generator system is certified to generate always maximally unpredictable sequences of the quantum random (QR) ternary digits, meaning that no single bit of the sequence can be predicted by any algorithm.

In some embodiments, an encryption system is provided to encrypt information. The encryption system may be part of a mobile device, a cryptographic device, a computing device and a data security device. The encryption system may include or communicate with the key generator system that is certified to generate always maximally unpredictable sequences of QR ternary digits.

In some embodiments, the three-dimensional (3D) quantum random number generator (QRNG) may be used in communications platforms, encryption, cryptography, cryptocurrency, crypto-wallets, crypto-tokens, blockchains, gambling platforms, computer simulations, computerized gaming platforms, and other digital technically that uses or requires randomly generated numbers.

In some embodiments, a cloud system is provided that is certified to generate always maximally unpredictable sequences of QR ternary digits from which key bits for an encryption key may be generated.

FIG. 1 illustrates a block diagram of a key generator system 100 using universal three-dimensional (3D) quantum random number generator (QRNG) 110. The system 100 will also be described in relation to FIG. 2, which illustrates block diagram of the key generator system 100 of FIG. 1 and the applications of the computing device 150. With specific reference to FIG. 1, the system 100 may include a 3D QRNG 110 and a computing device 150 which will be described in more detail in relation to FIGS. 2 and 8. The computing device 150 is a classical computing device.

The 3D QRNG 110 may include a photon source 120, such as without limitation, a laser, and an optical unit 130 configured to produce a single random quantum number (SRQN). The photon source 120 generates a spin-1 particle. The photon source 120 may include an attenuated laser device, for example. The spin-1 particle includes three dimensions of quantum information in Hilbert space. This information may be observable information.

The photon source 120 may be configured to produce photons or other quantum units to decompose a 3D unitary operator representing the state of the system into two-dimensional unitary operators in order to allow for the physical implementation QRNG using an attenuated laser, for example, or other photon generator and beamsplitters in the preparation stage 134, as will be described in more detail below. By way of non-limiting example, the beamsplitters may be half-silvered mirrors.

The optical unit 130 may include a preparation stage 134 and a measurement stage 136, as will be described in more detail in relation to FIGS. 3-5. The 3D QRNG 110 may include a detector 140 configured to output a sequence of ternary numbers from the set $\{0, 1, 2\}$, for example. The sequence of ternary numbers are then sent to the computing device 150 for further processing to generate a random set of bits based on the sequence of numbers output from the 3D QRNG 110, in accordance with programmed instructions for generation of a key, such as an encryption key.

Since photons are a spin-1 particle, for example, their operators belong to a Hilbert space over the complex numbers of dimension three or more, thus guaranteeing the value indefiniteness of its measurement outcomes when a state satisfying the aforementioned conditions is prepared; and due to the dimensionality, three quantum states are resolvable outcomes with probability distribution dependent on the preparation state of preparation stage 134. In FIG. 3, the output is qutrits, for example.

The preparation stage 134 prepares the quantum processing unit (QPU) to have a value definite state $|\psi\rangle$ along the z-axis in a Hilbert space over the complex numbers with dimensions larger than two, and the state is neither orthogonal nor parallel to an arbitrary state of the spin-1 particle (photon) along the x-axis (as described by its eigenvectors). Therefore, the effect of the projection operator onto the x-axis (measuring along the x-axis) on the state $|\psi\rangle$ has no predetermined outcome, that is, the state of the spin-1 particle is value indefinite. This measurement operation (along the x-axis) is carried out by $U_x$ for any preparation state.

One or more components of the 3D QRNG 110 may be on one or more chips. For example, silicon photonics may be used to generate photons. The beamsplitters and/or interferometer components may be integrated on a chip. The chip may be manufactured using complementary metal-oxide semiconductor techniques. The 3D QRNG may be integrated into a single integrated circuit chip using complementary metal-oxide semiconductor techniques.

Figure 2:
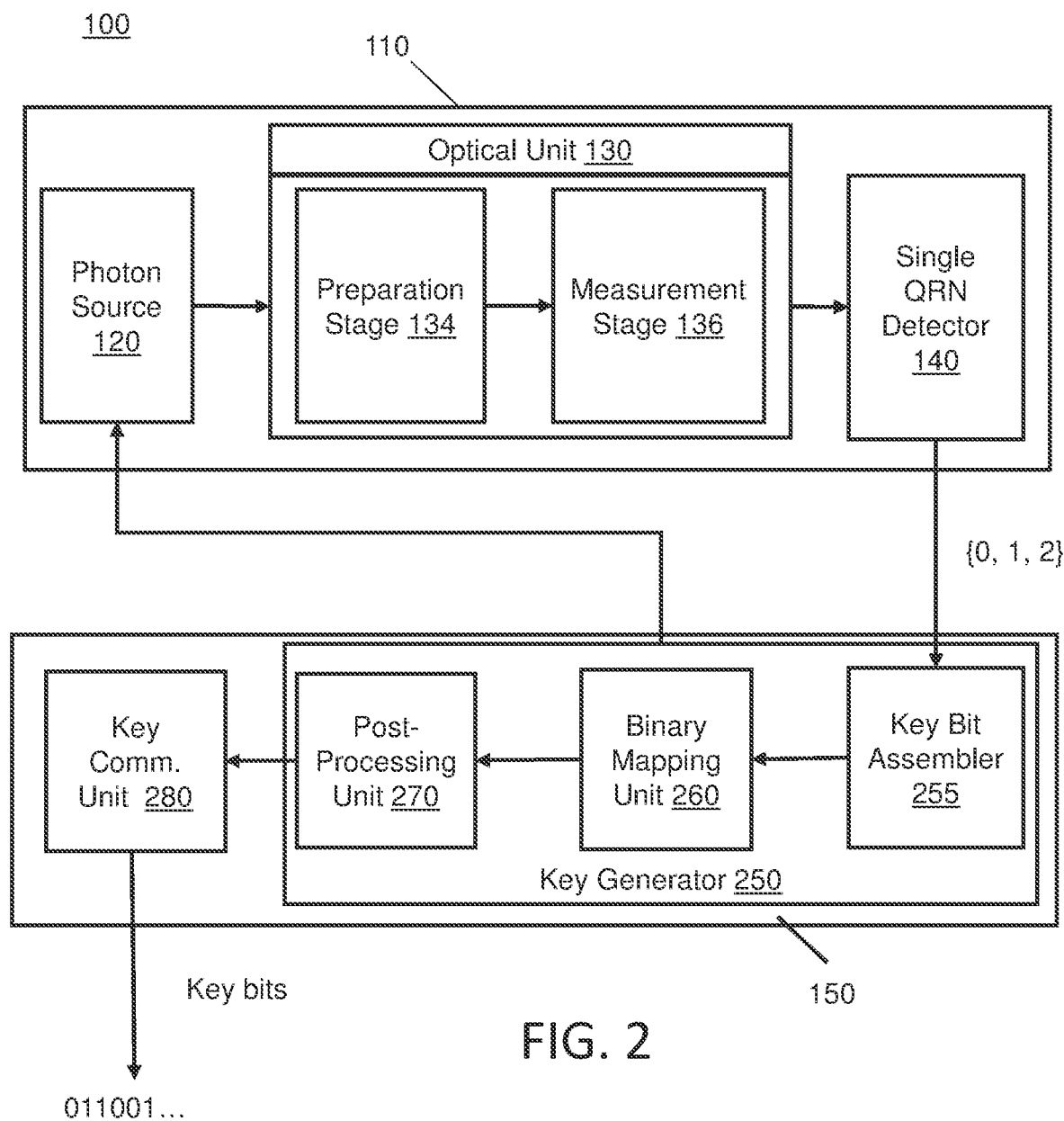
FIG. 2 illustrates a block diagram of the key generator system of FIG. 1.

Referring now to FIG. 2, the computing device 150 may include a key generator 250 configured to generate a key based on the output from the detector 140. The key generator 250 may include a key bit assembler 255 and a binary mapping unit 260. The key generator 250 may include a post-processing unit 270 configured to receive an output from the binary mapping unit 260. The key generator 250 projects the QR digits onto a binary system.

It should be noted that the post-processing unit 270 is optional and may include a fast Von Neumann normalization or other post-processing algorithm required by a specific application.

The post-processing unit 270 may perform additional mapping of the digits from the mapping unit 260. For example, post-processing unit 270 may disregard or eliminate any binary bit pairs that are the same, such as 00 and 11. Additionally, binary bit pairs 01 and 10 may be modified further to produce a 0 or a 1, for example. Nonetheless, other schemes may be used including considering patterns of three binary bits, for example.

The system can be tested from time to time. For example, random and very large samples (such as a minimum $2^{30}$ digits) of ternary quantum random digits may be tested with a standard NIST battery of tests augmented with specific, stronger tests like Borel normality and Chaitin-Schwartz-Solovay-tests, as described in A. A. Abbott, C. S. Calude, M. J. Dinneen, N. Huang, "Experimentally probing the algorithmic randomness and incomputability of quantum randomness," Physica Scripta, 94 (2019) 045103. If tests fail in a significant statistical way, then the system 100 can be replaced, for example.

The computing device 150 may include a key communication unit 280 configured to assemble and communicate the generated key included a sequence of bits to a separate or remote device (not shown).

The key bit assembler 255, binary mapping unit 260, the post-processing unit 270 and communication unit 280 may all include hardware, software, firmware or a combination thereof. The communication unit 280 may produce communication media for transmission to a remote computing device, for example.

The key bit assembler 255 of the key generator 250 may store and concatenate or assemble the assigned value of the measurement outcomes of the measurement stage 136. The outcomes are bits of a base 3, for example, hereinafter ternary digits from the set of {0, 1, 2}. The key bit assembler 255 assembles a string of N ternary digits for use by the binary mapping unit 260. The value of N is a non-zero and positive integer. For example, some keys are 32 binary bits, 128 bits or 256 binary bits. Other keys can be 1024 binary bits or 2048 binary bits, for example, or other industry standard. As should be understood, as processing speeds of computing devices increase, the number of bits in a key may increase. The computing device 150 should have registers, buffers and other hardware for producing a string of N binary bits.

The binary mapping unit 260 transforms the string of N ternary digits into a M bits through a structure preserving mapping. An example, is an algorithm disclosed in "A New Quantum Random Number Generator Certified by Value Indefiniteness," copyright 2020, by J. M. Agüero Trejo and C. S. Calude, Theoretical Computer Science, 862:3-13, September 2020, as will be described below.

By way of non-limiting example, the binary mapping unity 260 generates a binary random string using an alphabetic morphism algorithm. An example, alphabetic morphism algorithm is provided in equation EQ(1) which allows $\varphi: A_3 \to A_2$, where:

$$\varphi(a) = \begin{cases} 0, & \text{if } a = 0, \\ 1, & \text{if } a = 1, \\ 0, & \text{if } a = 2 \end{cases} \quad \text{EQ(1)}$$

In this example, the "a" corresponds to the measurement outcomes of the measurement stage 136, represented as a respective ternary digit. This can be extended sequentially from strings, $y(n)=\varphi(x(n))$ where n is a positive integer. The output from the key generator 250 is a string of binary bits corresponding to the generated key. The computing device 150 may control the operation of the 3D QRNG 110 to produce the sequence of ternary digits sufficient to generate the necessary number of binary bits for the key. By way of non-limiting example, the key generator 250 may control the photon source 120 to produce the spin-1 particles, as needed to produce the number of bits for key.

The system may employ a testing unit at the output of the post-processing unit 270 to perform a series of tests to reaffirm the quality of randomness of the generated key and delivers the key to the key communication unit 280 upon successful testing. The testing unit may test the output based NIST Special Publication 800-90A-90C, for example, and/or other NIST testing. The testing unit may perform other industry testing.

The generated key may be an encryption key compatible with the Advanced Encryption Standard (AES) or Data Encryption Standard (DES). Other encryption algorithms including RSA (Rivest, Shamir, Adleman) Encryption. Other encryption techniques may be used. The encryption key may be compatible with National Institute of Standards and Technology (NIST) 800 standards or other industry standards.

Figure 3:
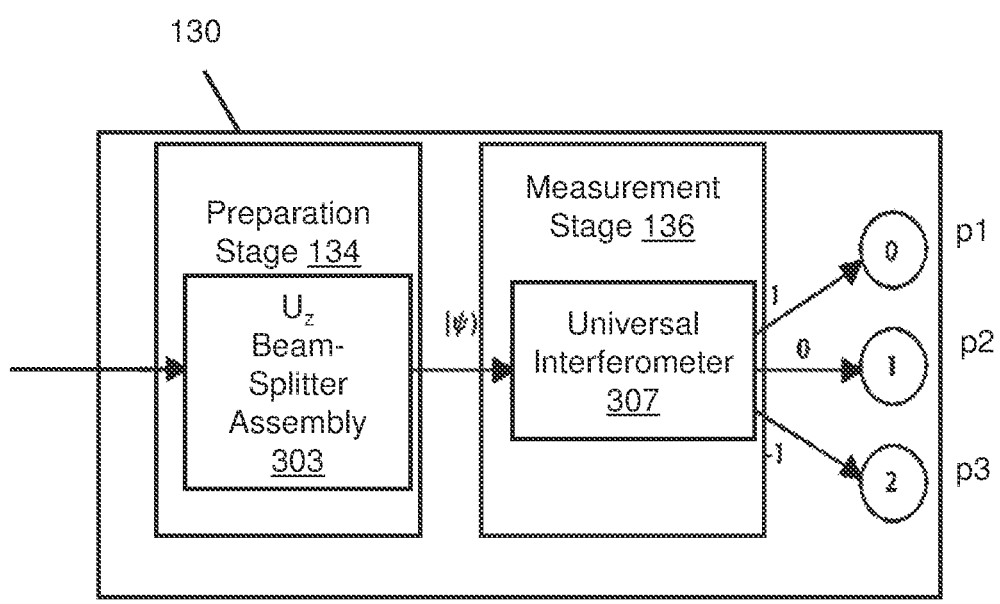
FIG. 3 illustrates a block diagram of an optical unit having a universal interferometer.

FIG. 3 illustrates a block diagram of an optical unit 130 having a universal interferometer 307. The optical unit 130 includes a preparation stage 134 that receives input from a source 120 and produces an output according to a selected probability distribution with p1, p2 and p3 that adds to 1. The preparation stage 134 may be a generalized $U_z$ beam-splitter assembly 303 that enables certification via value indefiniteness. An example, beam-splitter assembly 303 will be described in relation to FIG. 4. The beamsplitters, for example, of the beamsplitter assembly 303 however are configured based on i) the selected probability distribution that adds to 1; and ii) a selected one preparation stage candidate derived based on a value definite quantum (VDQ) states equation, as will be described in more detail in relation to FIG. 6A. The output from the preparation stage 134 is based on its design to be one of the Candidates with an output $|\psi\rangle$.

Figure 5:
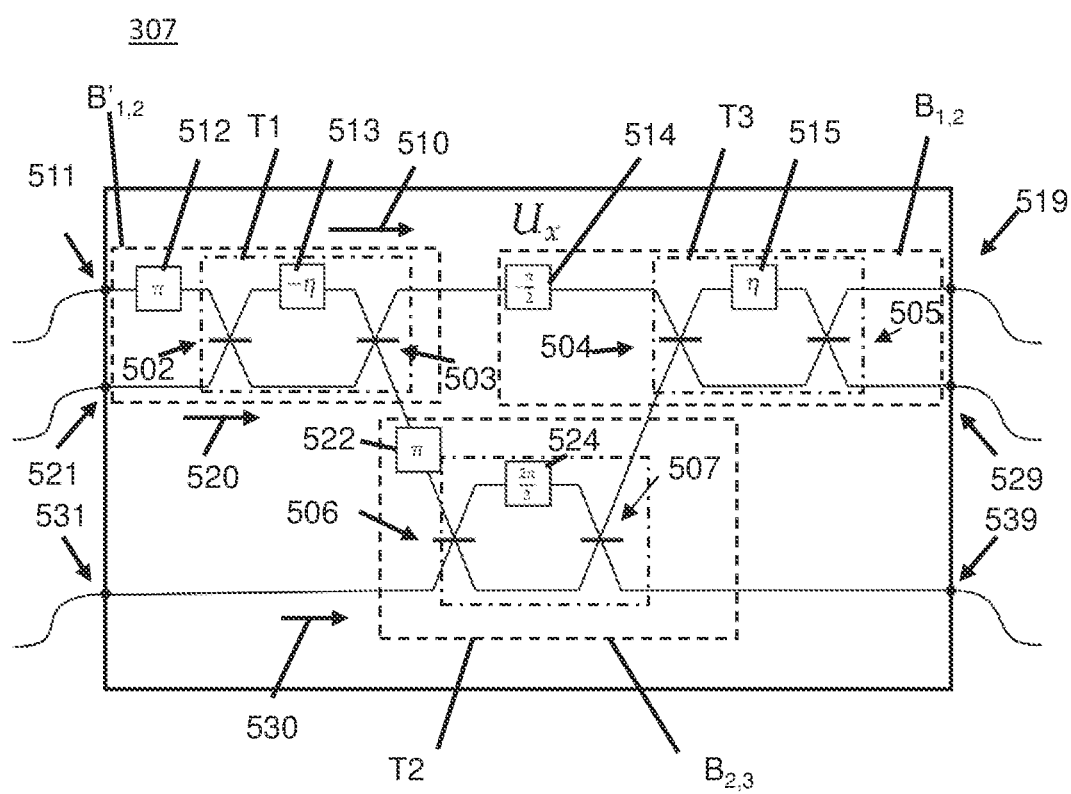
FIG. 5 illustrates a universal interferometer for a 3D quantum random number generator.

The universal interferometer 307, as will be described in more detail in relation to FIG. 5, is operational for any candidate based on the value definite quantum (VDQ) states equation Eq(3) (below), where the VDQ states equation is based any selected one probability distribution that adds to 1.

Figure 4:
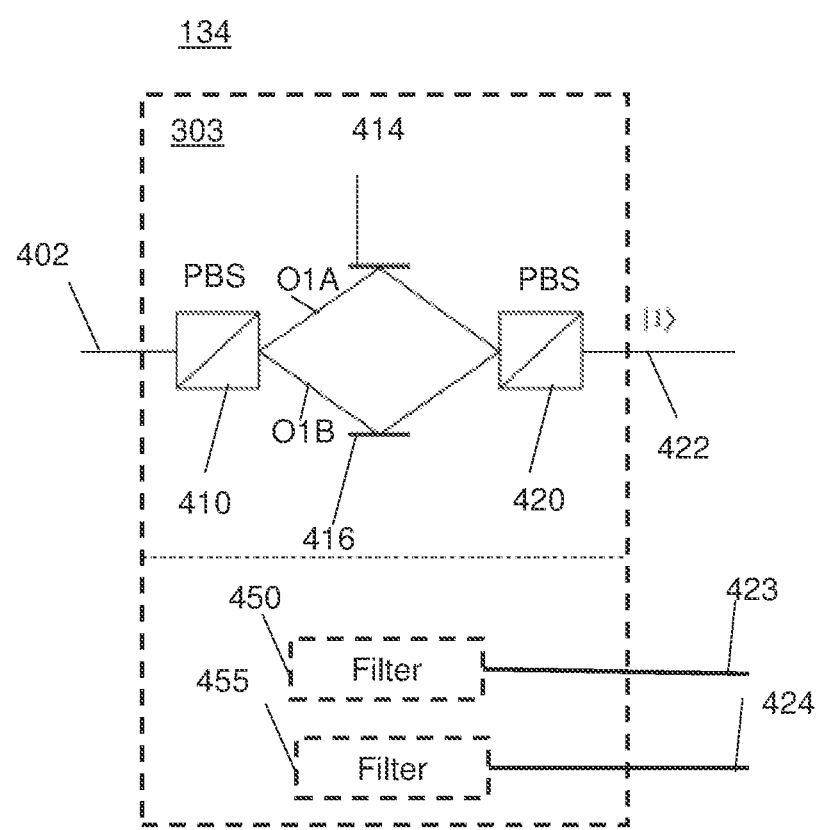
FIG. 4 illustrates a block diagram of a preparation stage for a selected candidate.

FIG. 4 illustrates a block diagram of a preparation stage 134 for a selected candidate that enables certification via value indefiniteness. In this example, the selected candidate corresponds to Candidate 1 equation below. However, the beam-splitters and components of the preparation stage 134 vary based on the selected Candidate equation. By way of non-limiting example, the beam-splitter assembly 303 splits each spin-1 particle received on line 402, for example, along the z-axis. The (z-axis) beam-splitter assembly 303 is denoted as "$U_z$ beam-splitter assembly 303" where z denotes the axis. The output $|\psi\rangle$ of the beam-splitter assembly 303 in the preparation stage 134 is input into universal interferometer 307. The output $|\psi\rangle$ is defined by the selected candidate from the available Candidates for the selected probability distribution.

For example, having a plurality of beam-splitters arranged in a mesh configuration in a three-dimensional Hilbert space and $|\psi\rangle$ is an arbitrary state in that space.

The selection of preparation states generated by the preparation stage 134 is presented to the measurement stage 136 and thereby achieving the aforementioned certification and attaining a probability distribution of measurement outcomes produced at the output of the measurement stage 136. This enables a structure preserving mapping to take action upon the sequence generated by concatenating the measurement outcomes from the measurement stage 136 to convert such outcomes from a ternary sequence of digits to a binary sequence of bits. As a consequence, the quality of random bits generated by 3D QRNG 110 is provably better than the quality of quantum random bits generated by any pseudo-random number generator and with the certainty of randomness certification that any other quantum random number generator lacks.

A quantum random sequence may be expressed in bits (as is the case in most cryptographic applications), thus requiring a mapping from the ternary digits obtained by this process to bits, and noting that an event with probability zero does not guarantee its impossibility. The preparation stage 134 in the preparation state $|1\rangle$ or $|-1\rangle$, derived through the aforesaid process, in order to obtain the probability distribution 1/4, 1/2, 1/4 of resolvable quantum states. Then, by means of an alphabetic morphism, the ternary sequence of digits generated by such embodiment can be mapped into a binary sequence with equal probability of finding a zero or one when selecting a bit at random, ensuring that the generated sequence of bits is maximally unpredictable, has Borel normal prefixes and is bi-immune, that is the sequence of quantum random bits, and of any sub-sequence thereof, is strongly incomputable in the sense that no algorithm can reproduce exactly any bit of the sequence.

Preparation Stage

The preparation stage 134 produces up to three (3) outputs, depending on the design of the preparation stage 134. In this example, the preparation stage 134 produces one output 422, which is an input into the measurement stage 136. Therefore, the other inputs the preparation stage 134 are blocked by at least one blocking filter 450, 455. Alternately, the filters may be part of the preparation stage 134 or the measurement stage 136. The filters may be used to block noise, for example. In other embodiments, the filters may be substituted with other connections to prevent noise from entering unused ports of the measurement state 136. However, it should be understood that some configurations of the preparation stage 134 may use two or three input ports of the universal interferometer described herein according to the Candidate with an output $|\psi\rangle$.

The $U_z$ beam-splitter assembly 303 include beamsplitters 410 and 420 constructed and arranged to split a single photon or other spin-1 received on input 402 of the beam-splitter assembly 303. The photon received by beam-splitter assembly 303 may be represented as a $|1\rangle$. It should be understood that the term "$|1\rangle$" is not equivalent to a binary bit of 1. Likewise, "$|0\rangle$" is not equivalent to the binary bit of 0. This is one possibility of the example with a probability distribution set of 1/2, 1/4, 1/2 and it should be understood that other options exists according to the Candidates below and for other probability distribution sets, according to its Candidates. The input single photon or other spin-1is then split by beamsplitter 410. The output of beam-splitter 402 produces split outputs O1A and O1B. The output O1A is transferred to mirror 414 which is then sent to beamplitter 420. The output O1B is transferred to mirror 416 which is then sent to beamplitter 420. Either mirrors or couplers may be used depending on the chosen implementations.

Measurement Stage

The measurement stage 136 may be configured to generate numbers an outcome attained by measuring the state of a particle utilized to prepare a three-dimensional (3D) quantum system in a state that satisfies a set of conditions that guarantees there is no definite value associated to the measurement outcome. The measurement stage 136 may be configured to always guarantees the Borel normality and provable maximal unpredictability of the sequence generated by concatenating the measurement outcomes described therein. This may provide an advantage over prior quantum random number generators, where the claimed unpredictability of measurement outcomes is dependent on unproved assumption regarding the indeterminism in quantum mechanics.

FIG. 5 illustrates a universal interferometer 307 of the measurement stage 136. The universal interferometer 307 includes three (3) two-dimensional (2D) interferometers, denoted in a dash-dot box numbered T1, T2 and T3, connected and arranged to measure along an x-axis of a Cartesian coordinate standard system the prepared photon and preserving the three-dimensions of observable/quantum information in the Hilbert space of the prepared photon. The universal interferometer 307 may include three output ports 519, 529 and 539, which produce a measured photon according to 3D eigenstates (i.e., measurement outcome $|1\rangle$, $|0\rangle$, or $|-1\rangle$, as shown in FIG. 3.

The universal interferometer 307 may include three input ports 511, 521 and 531. The universal interferometer 307 may receive at least one input from the preparation stage 134 or one or more of the input ports 511, 521 and 531 may be blocked. For example, inputs to ports 521 and 531 may be blocked by filters 450 and 455, respectively. By way of non-limiting example, output 422 may be received at input port 511.

The universal interferometer 307 may have three paths, denoted by arrows 510, 520 and 530, to three output ports 519, 529 and 539. Each path will now be described. The terms input and output may sometimes be referred to as input port and output port, respectively.

The first path 510 is connected between the first input 511 and the first output 519. The first path 510 includes a plurality of phase adjusters 512 and 514. The first path 510 may include a plurality of first-path balanced couplers 502, 503 and 504, 505, each corresponding first-path balanced couplers preceded by a first-path phase adjuster 512 or 514 at one input port of the corresponding balance coupler. The balanced couplers 502, 503 are in the interferometer T1. The balanced couplers 504, 553 are in the interferometer T3. The balanced couplers may include a lossless beam splitter.

The first-path balanced couplers coupler 502, 503 is proceeded by phase adjuster 512. The first-path balanced coupler 504, 505 is proceeded by phase adjuster 514. Each balanced coupler is preceded by a phase shifter or phase adjuster at one input port (acting as a physical beamsplitter). The one input port at which a phase shifter or phase adjuster is connected is a first input port. The coupler also includes a second input port, a first output port and a second output port. One or more first-path balanced couplers in the first path 510 are shared with the second path 520. Thus, the first-path balanced couplers 502, 503 and 504, 505 are shared with the second path 520 to merge the photons propagated along the first path and the second path. The phase adjuster 512 may include a phase shifter of approximately $\pi$; and the phase adjuster 514 may include a phase shifter of approximately $$-\frac{\pi}{2}.$$

The universal interferometer is defined by equation EQ(2) below and corresponding matrices. Each 2D interferometer is preceded by a phase shifter or phase adjuster to form a phase adjuster-interferometer pair. These pairs are defined by matrix $B'_{1,2}$ and $B_{1,2}$ in the first path and the matrix $B_{2,3}$ in the third path.

Each 2D interferometer has a phase $\theta$, denoted in each of boxes 513, 515 and 524 to define a reflectivity of $\cos(\theta)$ and transmittance of $\sin(\theta)$. By way of non-limiting example, the phase of box 515 is defined by eta or $$\eta = 2\arccos\left(\sqrt{\frac{2}{3}}\right) = 2\theta$$

and box 513 is $-\eta = 2\theta$.

The phases of boxes 513 and 515 are used to derive the reflectivity and transmittance within the Mach-Zehnder interferometer with a value equal to approximately a phase of $2\theta$. The dashed box denoted as $B'_{1,2}$ is representative of the matrix $B'_{1,2}$ as described in more detail later. The dashed box denoted as $B_{1,2}$ is representative of the matrix $B_{1,2}$ as described in more detail later.

The second path 520 may be connected between the second input 521 and the second output 529 and connected to the at least one first-path balanced coupler. The second path 520 is connected to the third path 530 and includes a second-path phase adjuster 522. For example, the second path 520 is connected to the third path 530 via a first third-path balanced coupler 506, 507 where the second-path phase adjuster 522 proceeds the first third-path balanced coupler 506, 507. By way of non-limiting example, third-path balanced coupler 506, 507 has a first input from the second path via second-path phase adjuster 522. The third-path balanced coupler 506, 507 may have a second input the receives a photon propagated to third input port 531.

The first output of balanced coupler 504, 505 produces, for example, the output to the first output port 519. The second output of balanced coupler 504, 505 produces, for example, the output to the second output port 529.

The third path 530 may be connected between the third input port 531 and the third output port 539. The third path 530 may include a third-path balanced coupler 506, 507 has one input coupled to phase shifter 522. The second input of the third-path balanced coupler 506, 507 has an input coupled to input port 531. The second path 520 shares the third-path balanced coupler 506, 507 with the third path 530. The phase $\theta$ of box 524 associated with the interferometer T2 of matrix $B_{2,3}$ is approximately $$\frac{2\pi}{3}.$$

By way of non-limiting example, one (first) output port of the third-path balanced coupler 506, 507 is connected to an input port of second first-path balanced coupler 504, 505. Another (second) output port of third-path balanced coupler 506, 507 is connected to third output port 539. The phase may be used to derive the reflectivity and transmittance within the Mach-Zehnder interferometer with a value equal to approximately $2\theta$. Phase adjuster 522 precedes the lossless beam splitter of the third-path balanced coupler 506, 507. The dashed box denoted as $B_{2,3}$ is representative of the matrix $B_{2,3}$, as described in more detail later.

Such arrangement is equivalent to the physical realization of a 3-mode multi-port interferometer 307 implementing $U_x$, where a Mach-Zehnder interferometer includes of a phase shift and two 50:50 directional couplers is used to implement the matrices corresponding beamsplitter matrices described below.

The universal interferometer includes three Mach-Zehnder interferometers (arranged as shown in FIG. 5) and the reflectivity and transmittance parameters are given by a phase of $\theta$, as each of these has two balanced beamsplitters. The parameter in FIG. 5 is equivalent to a phase of $2\theta$ (standard convention). Each of them is preceded by a phase shift given by $\phi$.

First matrix $B'_{1,2}$ corresponds to a lossless beamsplitter between channels 1 and 2 (paths 510 and 520) with a phase shift $\pi$ at the input of interferometer T1 and the reflectivity and transmittance are physically implemented by using the two balanced couplers, the corresponding value to derive the phase of $2\theta = -\eta$ or eta, defined above.

Similarly, the matrix $B_{2,3}$ corresponds to a lossless beam splitter of 2D interferometer T2 between paths 520 and 530 with a phase shift of $\pi$ at phase shifter 522 and reflectivity and transmittance are physically implemented by using the two balanced couplers according to the phase $$2\theta = \frac{2\pi}{3}$$

according to matrix $B_{2,3}$.

The matrix $B_{1,2}$ corresponds to a lossless beamsplitter between channels 1-3 (paths 510, 520 and 530) with a phase shift $-\pi/2$ at the input of interferometer T3 and the reflectivity and transmittance are physically implemented by using the two balanced couplers, with a corresponding phase of $2\theta=\eta$(eta).

Each of the dashed boxed representing matrices includes a 2D Mach-Zehnder Interferometer. The universal interferometer preserves three-dimensionality of the preparation state.

The matrices comprising the aforesaid decomposition represent a generalized rotation operation that preserve the advantageous properties of the aspects of the embodiment described above due to the existence of a structure preserving mapping from the set of two-dimensional (2D) unitary matrices with determinant one and the rotational group formed by orthogonal transformations in a three-dimensional vector space, establishing a property preserving approximation of the quantum system in three dimensions of Hilbert space, thus ensuring the quality of the quantum random bits is preserved by the physically realizable embodiment of the theoretical system.

Referring again to FIG. 2, an aspect of the embodiments include a computing device 150 that stores the measurement outcomes of the corresponding three-dimensional quantum system in the following manner. The values 0, 1, 2 are assigned to the possible measurement outcomes $|1\rangle$, $|0\rangle$, and $|-1\rangle$ of an eigenstate from the measurement stage 136. The detector 140 detects at an instantiation which measurement outcome $|1\rangle$, $|0\rangle$, or $|-1\rangle$ is produces by the measurement stage 136 and outputs a respective one ternary digit 0, 1 or 2.

Additional photons are repeatedly propagated through the preparation and measurement stages 134, 136 and the output values are stored and concatenated to form a ternary string of digits until the desired length of the ternary string of digits is reached, then, the processing unit maps the ternary string of digits to a binary string of bits by scanning the original string left to right and transforming the ternary string digits from 0, 1, 2 to 0, 1, 0, respectively.

In some embodiments, if testing is performed by the testing unit, then a testing unit performs a series of statistical and algorithmic tests of randomness to the resulting binary string of bits (also referred to as the key) in order to ensure that the outcome consistently provides genuinely random keys. The algorithmic tests include tests of incomputability and a quantifiable test of (Borel) normality.

Embodiments of the physical realization of the embodiments are possible by any means of producing a quantum system of dimension greater than two capable of preparation of a quantum state as previously described and implementing the aforementioned unitary operators describing the measurement stage 136 . Alternatives include, but are not limited to, various physical platforms such as continuous spin systems; ion trap; nuclear magnetic resonance; molecular magnets; quantum dot systems; superconducting quantum system (transmon); other photonic systems such as optical lattices, quantum dots placed in optical cavities, among others. For instance, many of such methods are capable of generating the dimensionality and particular states required by this protocol through manipulation of the orbital angular momentum of particles.

In view of the disclosure described herein, it should be recognized that the embodiments do not rely on the source of the three-dimensional (3D) quantum state, rather, its value lies on the value indefiniteness certification provided by the properties of the quantum system and its corresponding observables achieved by the careful preparation and measurement stages 134, 136 described therein, independently of the particulars of how the quantum system required is achieved.

In any embodiments, the 3D QRNG 110 has a universal representation of the unitary spin-1 operator describing a 3D quantum system and a preparation state which is a value indefinite observable. The photon is used because photons are readily available, easy to detect, reflect and transmit off a variety of materials (e.g., semi-silvered mirrors) and can be made to be harmless.

The universal unitary operator $U_x$, where D consists of single mode phase shifts can be adjusted to set the reflectivity, transmittance and phase shifts values, defined in Table 1 below. The universal interferometer is designed based on equation EQ(2):

$$U_x = B^{-1}_{1,2} \cdot B_{2,3} \cdot D \cdot B_{1,2} = D' \cdot B'_{1,2} \cdot B_{2,3} \cdot B_{1,2} \qquad \text{EQ(2)}$$

where $U_x$ performs the measurement along an x-axis of a standard Cartesian coordinate system;

matrices $B_{1,2}$, $B_{2,3}$, $B^{-1}_{1,2}$ and D include:

$$B_{1,2} = \begin{pmatrix} \sqrt{\frac{2}{3}} & \frac{1}{\sqrt{3}} & 0 \\ \frac{i}{\sqrt{3}} & -i\sqrt{\frac{2}{3}} & 0 \\ 0 & 0 & 1 \end{pmatrix};$$

$$B_{2,3} = \begin{pmatrix} 1 & 0 & 0 \\ 0 & \frac{1}{2} & \frac{-i\sqrt{3}}{2} \\ 0 & \frac{\sqrt{3}}{2} & \frac{-1}{2} \end{pmatrix};$$

$$B^{-1}_{1,2} = \begin{pmatrix} \sqrt{\frac{2}{3}} & \frac{-i}{\sqrt{3}} & 0 \\ \frac{1}{\sqrt{3}} & i\sqrt{\frac{2}{3}} & 0 \\ 0 & 0 & 1 \end{pmatrix}; \text{ and}$$

$$D = \begin{pmatrix} 1 & 0 & 0 \\ 0 & -1 & 0 \\ 0 & 0 & -1 \end{pmatrix}.$$

Furthermore, matrices D' and $B'_{1,2}$ include:

$$D' = \begin{pmatrix} 1 & 0 & 0 \\ 0 & i & 0 \\ 0 & 0 & -1 \end{pmatrix}; \text{ and}$$

$$B'_{1,2} = \begin{pmatrix} \sqrt{\frac{2}{3}} & \frac{i}{\sqrt{3}} & 0 \\ -\frac{i}{\sqrt{3}} & -\sqrt{\frac{2}{3}} & 0 \\ 0 & 0 & 1 \end{pmatrix}.$$

For example, the probability distribution may include a combination of signs for the probabilities, such as, for example, (+p1, -p2, +p3), (+p1, -p2, -p3) and (+p1, +p2, +p3). The probabilities p1, p2, and p3 are rational numbers less than 1 and greater than zero. At least one probability distribution (i.e., (+p1, +p2, +p3)) adds to 1. The other probabilities vary based on changing the sign of p2 and p3. It should be understood that there are eight (8) possible probability distribution sets, which would include for example, -p1. Then, the value definite quantum (VDQ) states may be determined according to equation EQ(3), defined as:

$$z = \left[ \pm \frac{\sqrt{p1}}{2} \mp \frac{\sqrt{p2}}{\sqrt{2}} \pm \frac{\sqrt{p3}}{2} \right] \quad \text{EQ(3)}$$

The eigenstates of the spin-1 state observable along the x-axis describing the quantum system, corresponding to $U_x$ with respect to the standard Cartesian basis, is defined by a VDQ states may be constructed according to equation EQ(4), defined as:

$$|\psi*\rangle = [\pm\sqrt{2}\sqrt{p2} + z]|1\rangle + [\pm\sqrt{p2} \mp \sqrt{2}\sqrt{p3} + z\sqrt{2}] \quad \text{EQ(4)}$$
$$|0\rangle + \left[ \pm \frac{\sqrt{p1}}{2} \mp \frac{\sqrt{p2}}{\sqrt{2}} \pm \frac{\sqrt{p3}}{2} \right]|-1\rangle$$

where, ±indicates that the sign for the element is the same as set in Step 2 and ∓ indicates that the sign is the opposite.

The measurements of $|\psi\rangle *$ produce the outputs with probabilities p1, p2, p3, respectively. Furthermore, as $|\psi\rangle *$ is value indefinite, it satisfies Kochen-Specker Theorem which guarantees maximal unpredictability of the generated quantum random ternary digits.

For probability distribution p1=1/4; p2=1/2; and p3=1/4, Table 1 illustrates the θ and φ to determine the transmittance, reflectivity and external phase shift where transmittance is cos θ; reflectivity is sin θ; and the external phase shift is φ.

TABLE 1

| $B_{m,n}$ | θ | φ |
|---|---|---|
| $B'_{1,2}$ | $\frac{-\eta}{2}$ | π |
| $B_{2,3}$ | $\frac{\pi}{3}$ | π |
| $B_{1,2}$ | $\frac{\eta}{2}$ | $\frac{-\pi}{2}$ |

This physical implementation is integrated in the measurement stage of the general diagram of the 3D QRNG. Here, the preparation stage (generating the input for the measurement stage) includes photons prepared in the optimal state by the action of a physical measurement apparatus; this can be achieved through the use of polymer waveguides or half-silvered mirror acting on incident photons produced by an attenuated laser (among other alternatives).

Figure 6A:
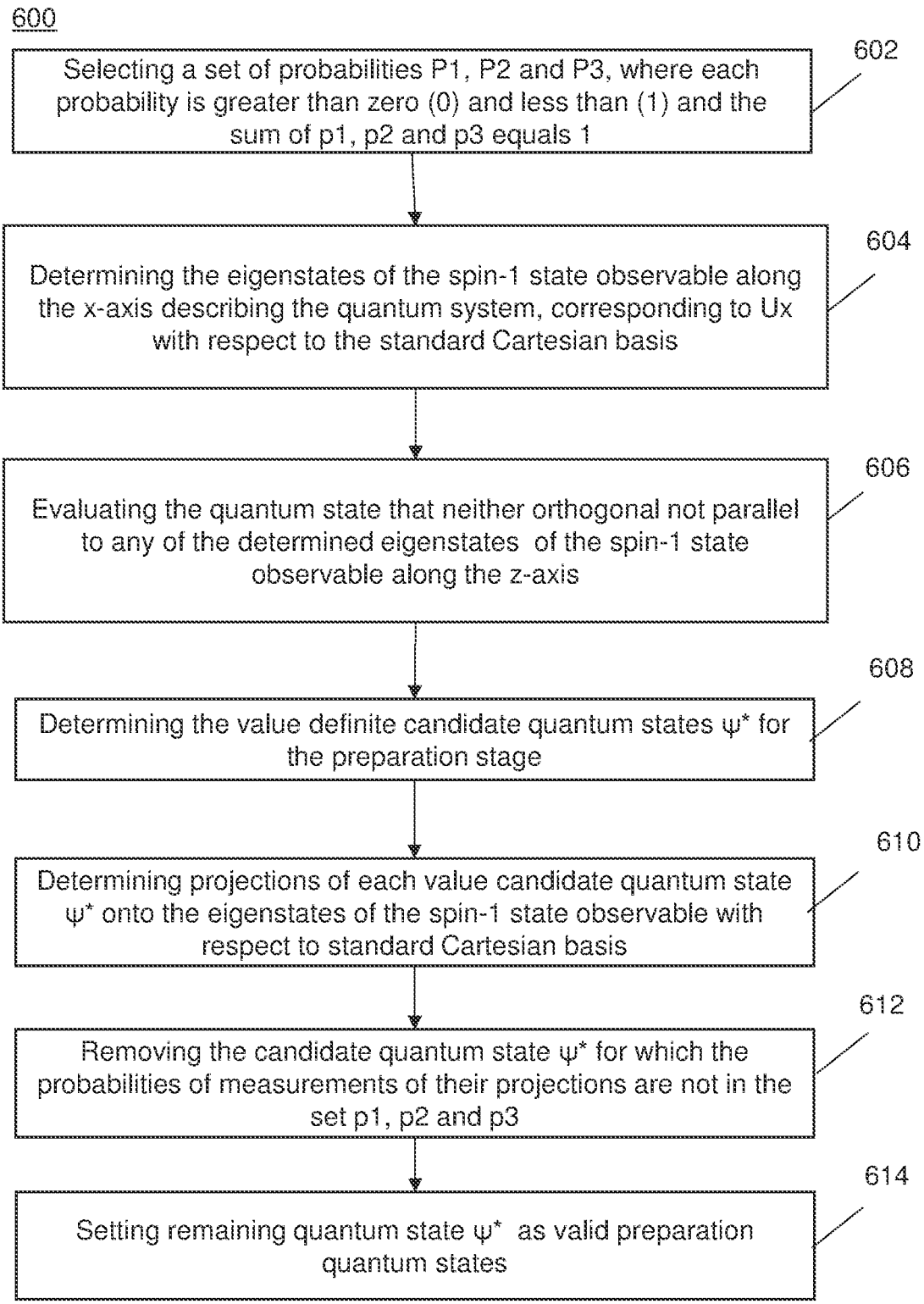
FIG. 6A illustrates a flowchart of a method for preparing a preparation stage.

FIG. 6A illustrates a flowchart of a method 600 for preparing a preparation stage. The method steps may be performed in the order shown or a different order. One or more of the method steps may be performed contemporaneously. One or more steps may be deleted in an iteration or added.

The method 600 may include, at 602, selecting a set of probabilities p1, p2 and p3, where each probability is a rational number less than 1 and greater than zero and the sum of p1, p2 and p3 equals 1.

For example, the probability distribution may include a combination of signs for the probabilities, such as (+p1, -p2, +p3), (+p1, -p2, -p3) and (+p1, +p2, +p3) square root of probabilities. Then, the value definite quantum (VDQ) states may be determined according to equation EQ(3), above.

The method may include, at 604, determining the eigenstates of the spin-1 state observable along the x-axis describing the quantum system, corresponding to $U_x$ with respect to the standard Cartesian basis. is defined by VDQ states constructed according to equation EQ(4), above.

The method may include, at 606, evaluating the quantum state that is neither orthogonal nor parallel to any of the determined eigenstates of the spin-1 state observable along the z-axis.

The method may include, at 608, determining the value definite candidate quantum states $|\psi*\rangle$ for the preparation stage.

The method may include, at 610, determining projections of each candidate quantum state $|\psi*\rangle$ onto the eigenstates of the spin-1 state observable with respect to standard Cartesian basis.

The method may include, at 612, removing the candidate quantum state $|\psi*\rangle$ for which the probabilities of measurements of their projections are not in the set p1, p2 and p3.

The method may include, at 614, setting the remaining quantum state $|\psi*\rangle$ as valid preparation quantum states.

FIG. 6B illustrates a flowchart of a method 650 for measuring a prepared photon of a 3D quantum random number generator. The method 650 includes, at 652, receiving photons on at least one of three input ports of a universal interferometer, each input port configured to receive a corresponding prepared photon having three dimensions of quantum information in Hilbert space from a preparation stage of the 3D QRNG. Each corresponding prepared photon is prepared based on a selected probability distribution set selected from probability distribution sets of p1, p2 and p3 that add to 1 and where the p1, the p2 and the p3 are rational numbers less than 1 and greater than zero. Each raw photon is observable by virtue of its emitted light. Thus, the photon has observable information.

The method 600 may include, at 654, measuring, by three two-dimensional (2D) interferometers of the universal interferometer, along an x-axis of a Cartesian coordinate standard system the prepared photon and preserving three dimensions of quantum information in Hilbert space of the prepared photon. At 656, the method may include producing at one output port of three output ports of the universal interferometer a measured photon corresponding to a three-dimensional eigenstate.

The universal interferometer includes three paths. The method may include generating, by each path, the measured photon at one of the three output ports according to the selected probability distribution set and the measured photons causes generation of maximally unpredictable quantum random (QR) ternary digits, such that no single QR ternary digit can be predicted by for any of the probability distribution sets.

In view of equation EQ(2) above and the matrices, the method may include measuring the first phase adjuster-interferometer is in the first path of the universal interferometer defined by the matrix $B'_{1,2}$; measuring the second phase adjuster-interferometer is in the first path of the universal interferometer defined by the matrix $B_{1,2}$; and measuring by a third phase adjuster-interferometer pair is in the third path of the universal interferometer defined by the matrix $B_{2,3}$.

EXAMPLES

Example 1

Consider the probability distribution of (1/4, 1/2, 1/4). Accordingly, p1=1/4;p2=1/2; and p3=1/4. Using the equations EQ(3) and EQ(4), the candidate preparation quantum states include the following:

Candidate 1: $|\psi*\rangle = |\pm 1\rangle$;

Candidate 2: $|\psi*\rangle = \frac{1}{2}|1\rangle - \frac{1}{\sqrt{2}}|0\rangle + \frac{1}{2}|-1\rangle$;

Candidate 3: $|\psi*\rangle = -\frac{1}{2}|1\rangle + \frac{1}{\sqrt{2}}|0\rangle + \frac{1}{2}|-1\rangle$;

Candidate 4: $|\psi*\rangle = \frac{1}{2}|1\rangle + \left(\sqrt{2} - \frac{1}{\sqrt{2}}\right)|0\rangle - \frac{1}{2}|-1\rangle$; and Candidate 5: $|\psi*\rangle = -\frac{1}{2}|1\rangle + \left(\sqrt{2} + \frac{1}{\sqrt{2}}\right)|0\rangle + \frac{1}{2}|-1\rangle$.

For the sake of illustration, Candidate 1 is selected as $U_x$. Thus, with respect to a standard Cartesian basis, the preparation stage design configuration is selected to represent a candidate, such as Candidate 1, defined as equation EQ(5):

[0123] $|\psi 1*\rangle = |+1\rangle$                    EQ(5)

where $|\psi\rangle$ (FIG. 1) is an eigenstate of the spin-1 particle observed along the z-axis and in this case equal to equation EQ(5) corresponding to the selected candidate. The physical implementation of the preparation stage is designed according to the eigenstate.

FIG. 4 illustrates a physical implementation of a preparation stage 134 for a selected candidate. By way of non-limiting example, the preparation stage 134 may be designed with a 50:50 beamsplitter by blocking the outcome $|0\rangle$ (with respect to the same basis) or, in accordance with an embodiment via Mach-Zehnder interferometers for the measurement state, by arranging a Mach-Zehnder interferometer that includes two polarizing beamsplitters 410, 420 and two mirrors 414, 416, for example.

In this example, the presentation stage 134 has one output which is represented, according to this candidate as shown as equation EQ(5).

The interferometer 307 receives a photon at input 402 and produces an output on line 422 which is received by a port of the measurement stage.

Example 2

Consider the probability distribution of (1/2, 1/3, 1/3). Accordingly, p1=1/3; p2=1/3; and p3=1/3. Using the equations EQ(3) and EQ(4), the candidate preparation quantum states include the following:

Candidate 1: $|\psi*\rangle = \pm\frac{1}{\sqrt{3}}(|1\rangle + |-1\rangle) \pm \frac{1}{\sqrt{6}}(|1\rangle - |-1\rangle)$;

Candidate 2: $|\psi*\rangle = \frac{1}{\sqrt{6}}|1\rangle \pm \sqrt{\frac{2}{3}}|0\rangle - \frac{1}{\sqrt{6}}|-1\rangle$; and Candidate 3: $|\psi*\rangle = -\frac{1}{\sqrt{6}}|1\rangle \pm \sqrt{\frac{2}{3}}|0\rangle + \frac{1}{\sqrt{6}}|-1\rangle$.

For the sake of illustration, Candidate 1 is selected as Ux. Thus, with respect to a standard Cartesian basis, the preparation stage design configuration is selected to represent a candidate, such as Candidate 1, defined as equation EQ(6):

$$|\psi 1*\rangle = \left(\frac{1}{\sqrt{3}} + \frac{1}{\sqrt{6}}\right)|+1\rangle + \left(\frac{1}{\sqrt{3}} - \frac{1}{\sqrt{6}}\right)|-1\rangle. \quad\quad EQ(6)$$

where $|\psi\rangle$ is an eigenstate of the spin-1 observable along the z-axis. The physical implementation of the preparation stage is designed according to the eigenstate.

The physical realization of a high-dimensional photonic system capable of producing the mixed state derived through the aforesaid process can be accomplished through a variety of means. Particular care has to be taken to ensure that the state generation does not utilize a computational and/or probabilistic process and that 3-dimensionality is preserved: failing any of the above requirements will no longer guarantee the value indefiniteness certification offered by the present invention.

An example of a high-dimensional photonic system that fulfils the requirements necessary for generating the valid preparation quantum state derived by the aforesaid process can be implemented with a strongly coupled atom cavity system, polarizing beamsplitters and non-polarizing 50:50 beamsplitters. Such physical implementations have been experimentally realized and recently explored, and are thoroughly detailed in academia and industry. For example, the method is capable of producing an arbitrary qubit with a fidelity greater than 95%. Such high-dimensional photonic systems guarantee a given probability distribution for the outcomes, but do not necessarily produce value indefinite quantum states, hence they cannot be directly used for the quantum state preparations. (See, P. B. R. Nisbet-Jones, J. Dilley, A. Holleczek, O. Barter and A. Kuhn. Photonic qubits, qutrits and ququads accurately prepared and delivered on demand, New Journal of Physics 15 (2013) 053007 (11pp), doi:10.1088/1367-2630/15/5/053007.)

Certification

The 3D QRNG is formally certified to generate always (not only with high probability) maximally unpredictable sequences of quantum random ternary digits. This assertion can be proved using the non-probabilistic model of unpredictability based on predictors of the outcomes of physical experiments. (See, A. Abbott et al, "A non-probabilistic model of relativised predictability in physics," Information, 6(4):773-789, 2015; and A. A. Abbott et al., "On the unpredictability of individual quantum measurement outcomes," in Fields of Logic and Computation II, vol. 9300 of Lecture Notes in Computer Science, pg. 69-86. Springer, 2015, with editorsL. D. Beklemishev et al.

A predictor for the ternary outcomes of a physical experiment E is an algorithm $P_E$ which halts on every input and produces either an element in the set {0, 1, 2} or no prediction, "prediction withheld". The predictor $P_E$ can use any amount of finite information regarding the experiment E, but must be passive, that is, it must not disturb or interact with E in any way.

A predictor $P_E$ provides a correct prediction for an outcome x of E if it outputs 0, 1 or 2 (i.e., it does not refrain from making the prediction) and the output is equal to x, the result of the experiment. A predictor $P_E$ correctly predicts the experiment E in case $P_E$ can predict correctly as many outcomes of E as one wishes (which means that it cannot return "prediction withheld" more than finitely many times before making another correct prediction).

No predictor can correctly predict any sequence of ternary random digits produced by the 3D QRNG. Furthermore, no single digit of such a sequence can be correctly predicted, hence the sequence is maximally unpredictable.

In particular, the 3D QRNG is provable better than any pseudo-random number generator, a property no other QRNG has.

First, consider an experiment E producing a single digit x ∈ $A_3$, with $A_3$={0, 1, 2}. With a particular trial of E, associate the parameter λ (the state of the universe) which fully describes the trial; where λ can be viewed as a resource from which one can extract finite information in order to predict the outcome of the experiment E. The trials of E generate a succession of events of the form "E is prepared, performed, the result recorded, E is reset," iterated finitely many times in an algorithmic fashion.

Second, Definitions 1 and 2 are provided below.

Definition 1: An extractor is a physical device selecting a finite amount of information from λ, without altering the experiment E; where the extractor produces a finite string of digits ⟨λ⟩.

Definition 2: A predictor for E is an algorithm $P_E$ which halts on every input and produces an element of $A_3$ or the prediction is withheld.

The predictor $P_E$ can use the information ⟨λ⟩ as input, but must be passive, that is, it must not disturb or interact with E in any way.

The predictor $P_E$ provides a correct prediction using the extractor ⟨ ⟩ for instantiating E with parameter λ if, when taking as input ⟨λ⟩, it outputs an element of $A_3$ (i.e., it does not refrain from making a prediction) and the output is equal to x, the result of the experiment.

Third, fix an extractor; where the predictor $P_E$ is k, ⟨λ⟩-correct (referred to as k-correct for simplicity from herein below), if there exists an n≥k such that when E is repeated n times with associated parameters $\lambda_1, \ldots, \lambda_n$ producing the outputs $x_1, x_2, \ldots, x_n$, $P_E$ outputs the sequence:

$P_E\langle\lambda_1\rangle, P_E\langle\lambda_2\rangle, \ldots, P_E\langle\lambda_n\rangle$ with the following two properties: (i) no prediction in the sequence is incorrect, and (ii) in the sequence there are k correct predictions.

The confidence in a k, k-correct predictor increases as k→∞.

If $P_E$ is k, k-correct for all k, then $P_E$ never makes an incorrect prediction and the number of correct predictions can be made arbitrarily large by repeating E enough times.

If $P_E$ is not k, k-correct for all k, then we cannot exclude the possibility that any correct prediction $P_E$ makes is simply due to chance. Hence, it can be said that the outcome x of a single trial of the experiment E performed with parameter λ, is predictable (with certainty) if there exist an extractor ⟨ ⟩ and a predictor $P_E$ which is k, k-correct for all k, and $P_E$(⟨λ⟩)=x. In other words, x is the output of the predictor $P_E$ which never makes any incorrect prediction no matter how many times, theoretically infinitely many, it is used.

A sequence x over the alphabet $A_3$ is called 3-bi-immune if there is no partial computable function y:N→$A_3$ such that its domain dom(y) is infinite and y(i)=$x_i$ for every i ∈ dom(y) This yields Theorem 1 set forth below.

Theorem 1: A sequence x over the alphabet $A_3$ is 3-bi-immune if and only if no single digit of x can be predicted.

The Proof for Theorem 1 is provided below.

Proof. Let x be a 3-bi-immune sequence and assume that a digit $x_i$ of x can be predicted. Fix an extractor ⟨ ⟩, λ, and assume that there exists a predictor $P_E$ for x which is k, k-correct for all k ∈ N and $P_E$=(⟨$\lambda_i$⟩)=$x_i$. We can define the partial function φ:N→$A_3$ by φ(j)=$P_E$=(⟨ j ⟩), j ∈ N.

By definition, $P_E$ is an algorithm which halts on every input and for infinitely many j ∈ N, φ(j)=$x_j$, hence the set j ∈ N | φ(j)=$x_j$ is computable, contradicting the 3-bi-immunity of x.

Suppose no single digit of x can be predicted and assume for the sake of contradiction that x is not 3-bi-immune. Hence there exists a partial computable function y:N→$A_3$ with infinite domain and y(i)=$x_i$, for every i dom(y). Algorithmically, one can extract an infinite computable subset S dom(y) and set $\lambda_j$=j for the experiment which consists in the computation of the values of y(j), j ∈ S. Thus, one can construct a predictor $P_E$ which is k-correct for all k ∈ N by the formula of equation EQ(7):

$$P_E = (\langle\lambda_j\rangle) = P_E(j) = \begin{cases} y(j) & \text{if } j \in S \\ \text{prediction withheld}, & \text{othersise} \end{cases} \quad EQ(7)$$

that is k-correct for all k ∈ N because S is computable.

An experiment E performed in a 3-dimensional Hilbert space in which a spin-1 particle undergoes the preparation and measurement stages (as described in the present invention) produces a single quantum random ternary digit (due to the value indefiniteness of its projection observables).

Theorem 2: Let x be an infinite sequence of digits obtained by measuring a quantum value indefinite observable in $C^3$ in an infinite repetition of the experiment E. Then no single digit of x can be predicted, hence it is maximally unpredictable. Therefore, Corollaries 1, 2 and 3 follow, which are described below.

Corollary 1: Any infinite sequence of digits obtained as in Theorem 2 is 3-bi-immune.

Corollary 2: Let x be a sequence of digits generated by a 3D QRNG that measures a value indefinite observable with the universal unitary operator $U_x$. Then no single digit of x can be predicted, hence maximally unpredictable. In particular, x is 3-bi-immune.

As every 3-bi-immune sequence is incomputable, then:

Corollary 3: Every sequence of digits produced as in Corollary 2 is incomputable.

Corollary 3 proves the following important claim: the quality of the quantum random digits generated by the 3D QRNG 110 presented herein is provable better than the one produced by any pseudo-random number generator.

Figure 7A:
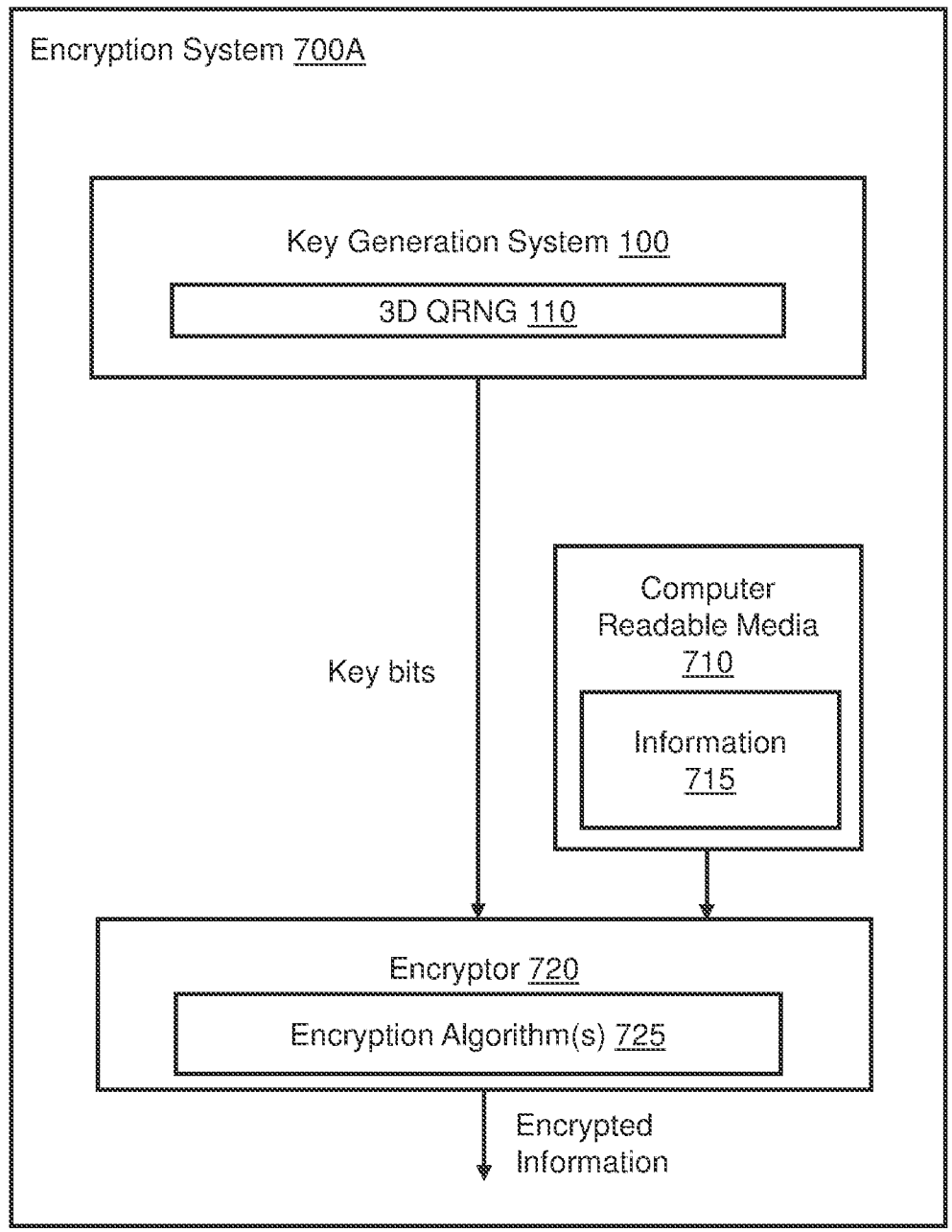
FIG. 7A illustrates an encryption system.

FIG. 7A illustrates an encryption system 700A. The encryption system 700A may include a key generator system 100 (FIGS. 1-2) to generate key bits of M bits, based on quantum random (QR) ternary digits where M is a non-zero and positive integer. The key generator system 100 (FIGS. 1-2) includes a 3D QRNG 110. The encryption system 700A may include computer readable media 710 which stores information 715 or other raw data that needs to be encrypted. The encryption system may include an encryptor 720 with at least one encryption algorithm 725. The at least one encryption algorithm 725 may be stored in computer readable media. The encryptor 720 may include software, firmware, hardware, or combinations thereof. For example, the key generator system 100 may include a computing device 150. The encryptor 720 may share one or more processors of the computing device 150, as will be described in relation to FIG. 8. The computer readable media may store raw data or information 715 and has programmable instructions stored thereon. The instructions which when executed cause the processor to receive the key bits from the key generation system 100 and encrypt the raw data and or information according to an encryption algorithm 725 that is compatible with an encryption standard. The encryptor 720 may communicate the encrypted information or encrypted raw data to a communication unit of the computing device for communication to a remote destination.

Figure 7B:
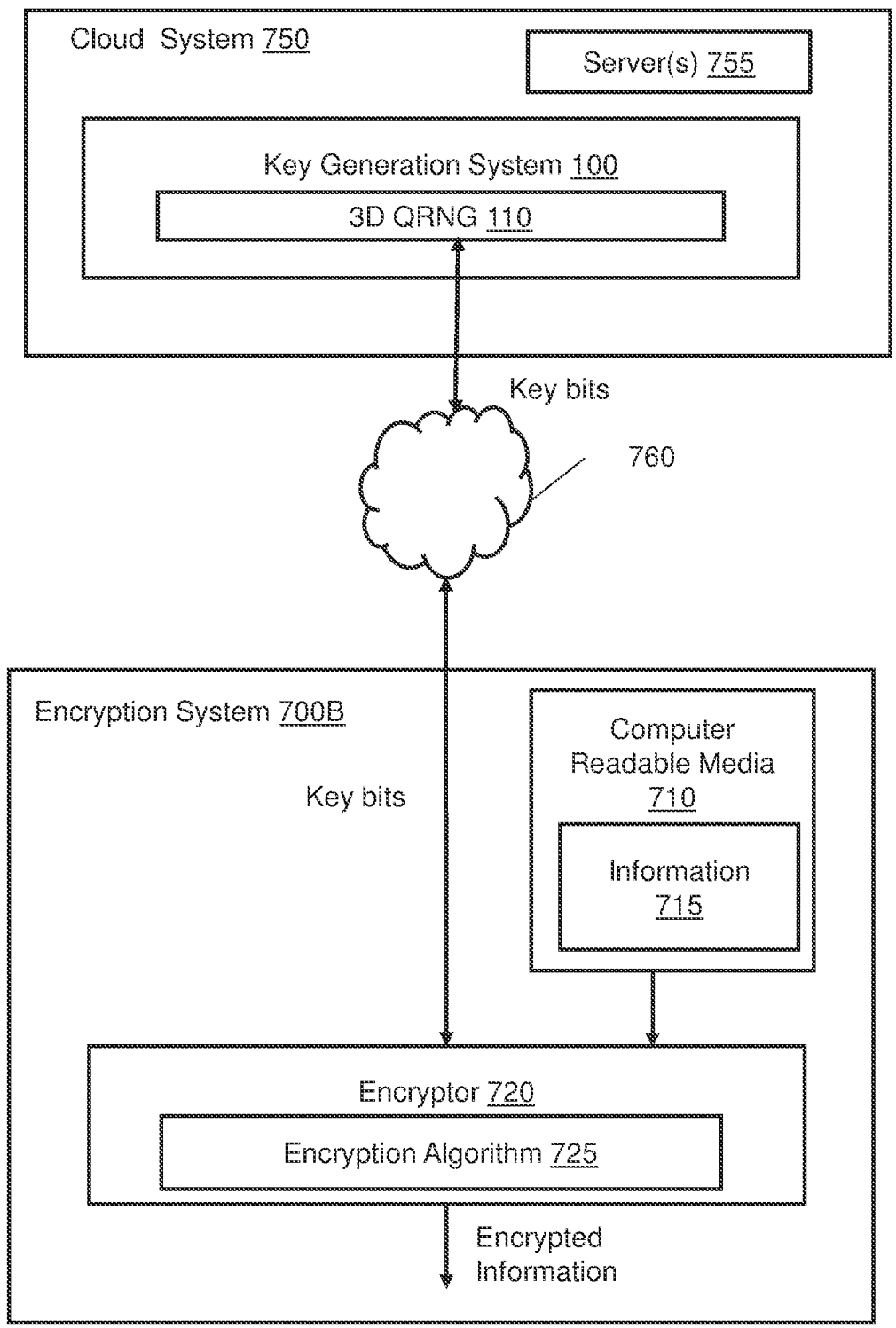
FIG. 7B illustrates an encryption system with remote key bit generation.

FIG. 7B illustrates an encryption system 700B with remote key bit generation such as by a cloud system 750. The cloud system 750 may include a key generator system 100 (FIGS. 1-2) to generate a key of M bits (i.e., the key bits), based on quantum random (QR) ternary digits where the value M is a non-zero and positive integer. The key generator system 100 (FIGS. 1-2) includes a 3D QRNG 110. The encryption system 700B may initiate a web-based session with cloud system 750 to cause the key generation system 100 to generate the key bits. The generated key bits are communicated to the encryption system 700B. The web-based session may determine the number of M bits needed for compatibility with an encryption standard. Prior to sending the M bits (i.e., key bits), the key generator system 100 will test the bits.

The cloud system 750 may be configured as a platform as a service (PaaS), in some embodiments. The cloud system 750 may be configured as infrastructure as a service (IaaS), for example. The cloud system 750 may communicate with the encryption system 700B using the Internet 760 or Intranet. The cloud system 750 may include one or more web-based servers 755 configured to run web applications for establishing a web-based session with a computing device or encryption system 700B of a plurality of encryption systems. The cloud system 750 may include customer login or sign-in. The cloud system 750 may include client authorization procedures. The authorization procedures may include two forms of authorization, in some embodiments.

The encryption system 700B may include computer readable media 710 which stores information 715 or other raw data that needs to be encrypted. The encryption system 700B may include an encryptor 720 with at least one encryption algorithm 725. The at least one encryption algorithm 725 may be stored in computer readable media. The encryptor 720 may include software, firmware, hardware, or combinations thereof. The encryptor 720 may include one or more processors, as will be described in relation to FIG. 8. The computer readable media may store raw data or information 715 and has programmable instructions stored thereon. The instructions which when executed cause the processor to receive the key bits from the key generation system 100 and encrypt the raw data and or information according to an encryption algorithm 725 that is compatible with an encryption standard. The encryptor 720 may communicate the encrypted information or encrypted raw data to a remote destination.

Figure 8:
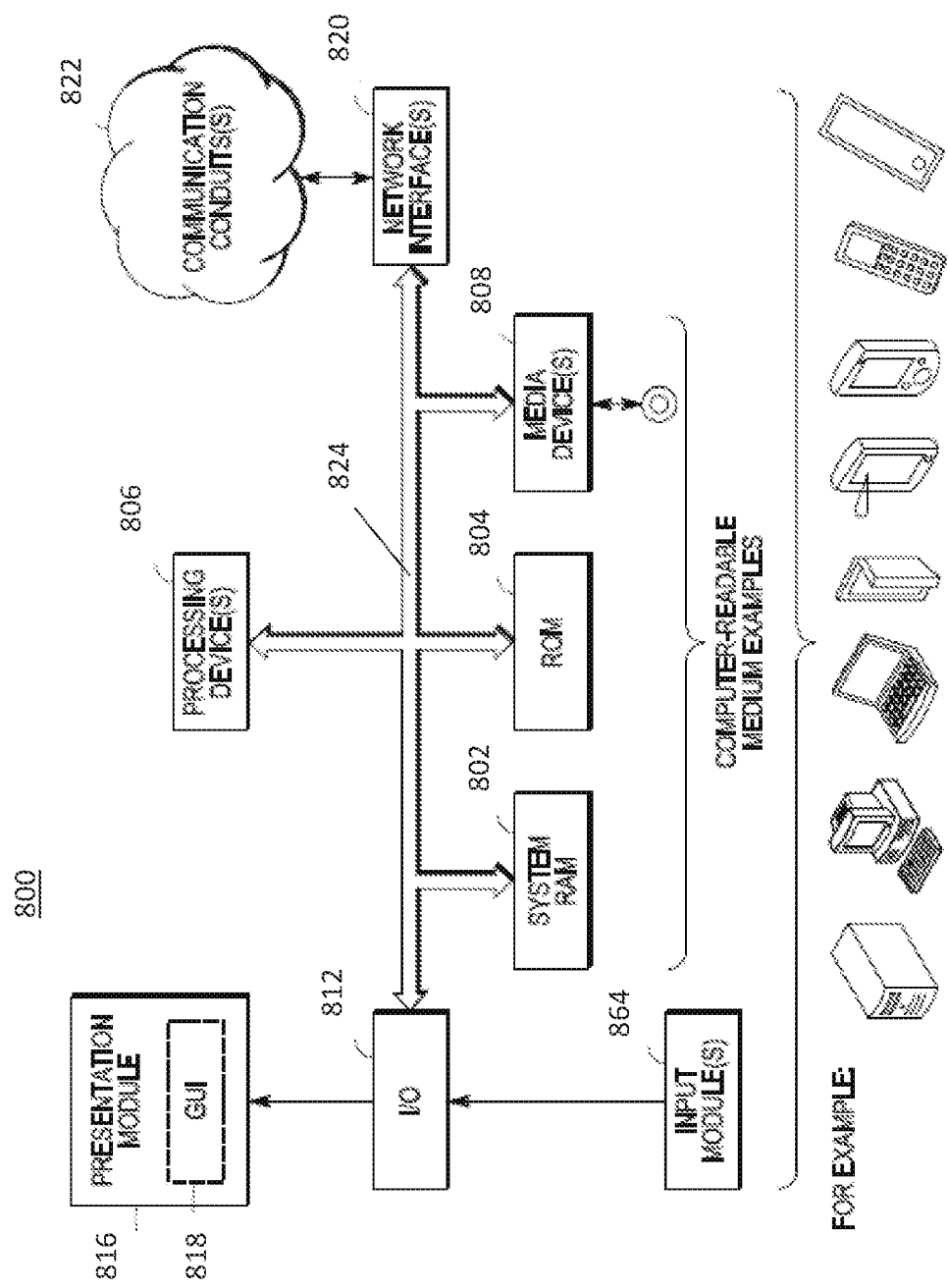
FIG. 8 is a block diagram of a classical computing device.

Referring now to FIG. 8, in a basic configuration, a computing device 800 (i.e., computing device 150) may include any type of stationary computing device, server, personal computer (PC) or a mobile computing device. The key generation system 100 may include one or more computing devices 800 (i.e., computing device 150). The cloud system 750 may include one or more computing devices 800 (i.e., server(s) 755). The computing device 800 may be a controller 950. The controller 950 may include software for the key generator 250. In other embodiments, the software modules for the key generator 250 may be in a remove computing device.

The computing device 800 may include one or more processing devices 806 and system memory in a hard drive. Depending on the exact configuration and type of computing device 800, system memory may be volatile (such as RAM 802), non-volatile (such as read only memory (ROM 804), flash memory, and the like) or some combination of the two. A system memory may store an operating system, one or more applications, and may include program data for performing at least one of encryption, communications, testing, control of the key generation system 100, for example. The program data may when executed may establish a web-based session and communicate using wired or wireless communication protocols.

The computing device 800 may carry out one or more blocks of a process in FIGS. 6A and 6B described herein. For example, one or more parts of the 3D QRNG may be manufactured as an integrated chip (IC) and embedded in a computing device. The computing device 800 may also have additional features or functionality. As a non-limiting example, the computing device 800 may also include additional data storage media devices 808 (removable and/or non-removable) such as, for example, magnetic disks, optical disks, or tape. The computer storage media devices 808 may include volatile and non-volatile, non-transitory, removable, and non-removable media implemented in any method or technology for storage of data, such as computer readable instructions, data structures, program modules or other data. The system memory, removable storage and non-removable storage are all non-limiting examples of computer storage media. The computer storage media may include, but is not limited to, RAM 802, ROM 804, Electrically Erasable Read-Only Memory (EEPROM), flash memory or other memory technology, compact-disc-read-only memory (CD-ROM), digital versatile disks (DVD) or other optical storage, magnetic cassettes, magnetic tape, magnetic disk storage or other magnetic storage devices, or any other physical medium which can be used to store the desired data and which can be accessed by computing device. Any such computer storage media may be part of device.

The computing device 800 may also include or have input/output (I/O) interfaces 812 for input modules 864 such as a keyboard, mouse, pen, voice input device, touch input device, etc. The computing device may include or have I/O interfaces 812 for connection to output device(s) such as a display, a presentation module 816, speakers, etc. A graphical user interface (GUI) 818 may be displayed on the presentation module 816. The computing device 800 may include a peripheral bus 824 for connecting to peripherals. Computing device 800 may contain communication connection(s) that allow the device to communicate with other computing devices, such as over a network or a wireless network. By way of example, and not limitation, communication connection(s) may include wired media such as a wired network or direct-wired connection, and wireless media such as acoustic, radio frequency (RF), infrared and other wireless media. The computing device 800 may include a network interfaces 820, such as a network interface card to connect (wired or wireless) to a network or other communication conduits 822.

Computer program code for carrying out operations described above may be written in a variety of programming languages, including but not limited to a high-level programming language, such as C or C++, Python, Java, for development convenience. In addition, computer program code for carrying out operations of embodiments described herein may also be written in other programming languages, such as, but not limited to, interpreted languages. Some modules or routines may be written in assembly language or even micro-code to enhance performance and/or memory usage. It will be further appreciated that the functionality of any or all of the program modules may also be implemented using discrete hardware components, one or more application specific integrated circuits (ASICs), or a programmed Digital Signal Processor (DSP) or microcontroller. A code in which a program of the embodiments is described can be included as a firmware in a RAM, a ROM, and a flash memory. Otherwise, the code can be stored in a tangible computer-readable storage medium such as a magnetic tape, a flexible disc, a hard disc, a compact disc, a photo-magnetic disc, and a digital versatile disc (DVD).

The embodiments may be configured for use in a computer or a data processing apparatus which includes a memory, such as a central processing unit (CPU), a RAM and a ROM as well as a storage medium such as a hard disc.

The "step-by-step process" for performing the claimed functions herein is a specific algorithm, and may be shown as a mathematical formula, in the text of the specification as prose, and/or in a flow chart. The instructions of the software program create a special purpose machine for carrying out the particular algorithm. Thus, in any means-plus-function claim herein in which the disclosed structure is a computer, or microprocessor, programmed to carry out an algorithm, the disclosed structure is not the general-purpose computer, but rather the special purpose computer programmed to perform the disclosed algorithm.

A general-purpose computer, or microprocessor, may be programmed to carry out the algorithm/steps for creating a new machine. The general-purpose computer becomes a special purpose computer once it is programmed to perform particular functions pursuant to instructions from program software of the embodiments described herein. The instructions of the software program that carry out the algorithm/steps electrically change the general-purpose computer by creating electrical paths within the device. These electrical paths create a special purpose machine for carrying out the particular algorithm/steps.

Unless otherwise defined, all terms (including technical and scientific terms) used herein have the same meaning as commonly understood by one of ordinary skill in the art to which embodiments belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In particular, unless specifically stated otherwise as apparent from the discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such data storage, transmission or display devices.

"Communication media" typically comprise computer readable instructions, data structures, program modules, or other data in a modulated data signal, such as carrier wave or other transport mechanism. The communication media may also comprise any information delivery media. The term "modulated data signal" means a signal that has one or more of its characteristics set or changed in such a manner as to encode information in the signal. By way of example, and not limitation, communication media comprises wired media such as a wired network or direct-wired connection, and wireless media such as acoustic, infrared, and other wireless media. Combinations of any of the above are also included within the scope of computer readable medium.

Alternatively, or in addition, any of the functions described herein may be performed, at least in part, by one or more hardware logic components. For example, without limitation, illustrative types of hardware logic components that may be used include Field-programmable Gate Arrays (FPGAs), Application-specific Integrated Circuits (ASICs), Application-specific Standard Products, System-on-a-chip systems, Complex Programmable Logic Devices, and the like.

The terms "module" and "component" as used herein generally represent software, firmware, hardware, or combinations thereof. In the case of a software implementation, the module or component represents program code that performs specified tasks when executed on a processor. The program code may be stored in one or more computer readable memory devices, otherwise known as non-transitory devices. The features of the embodiments described herein are platform-independent, meaning that the techniques can be implemented on a variety of commercial computing platforms having a variety of processors (e.g., set-top box, desktop, laptop, notebook, tablet computer, personal digital assistant (PDA), mobile telephone, smart telephone, gaming console, wearable device, an Internet-of-Things (IoT) device, and the like).

Figure 9:
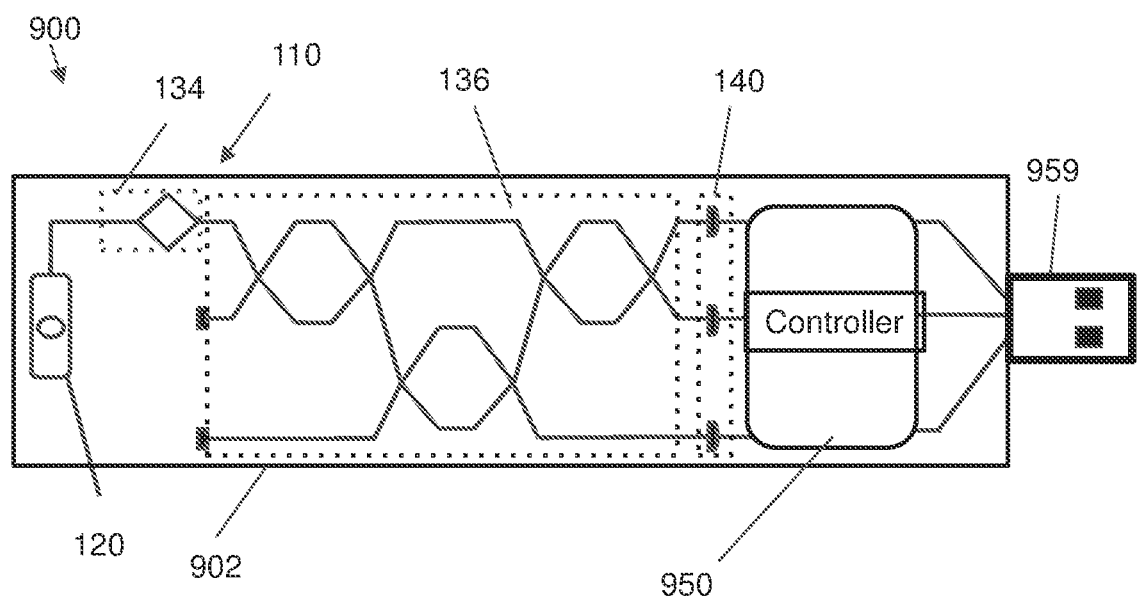
FIG. 9 illustrates a diagram of a mobile quantum random number generator device.

FIG. 9 illustrates a diagram of a mobile quantum random number generator device 900. The mobile QRNG device 900 may include the optical unit 130 of FIG. 1. The device 900 is implemented in a plug and play computing device having a housing 902. The device 900 may include a connector 959, such as a Universal Serial Bus (USB) connector, connected to the housing 902 and internal controller 950. The USB connector may be compatible with USB standards, such as USB-A, USB-B, USB-C type connectors. The USB connector may include a connector compatible with micro-USB type connectors. The optical unit 130 may include a light emitting diode (LED) 120 or another photon source 120. The device 900 may include a 3D QRNG 110 and a controller 950 described above in relation to FIG. 8. The controller 950 provides classical computing functionality for interfacing with a classical computing device.

The device 900 may include a preparation stage 134 and a measurement stage 136, as will be described in more detail in relation to FIGS. 3-5. The 3D QRNG 110 may include a detector 140 configured to output a sequence of ternary numbers from the set {0, 1, 2}, for example. The sequence of ternary numbers are then sent to the controller 950 for further processing. In an embodiment, the controller 950 may generate a random set of bits based on the sequence of numbers output from the 3D QRNG, in accordance with programmed instructions for generation of a key, such as an encryption key, or a quantum random number for other applications, such as cryptography, cryptocurrency, crypto-wallets, crypto-tokens, blockchains, gambling platforms, computer simulations, computerized gaming platforms, and other digital technically that uses or requires randomly generated numbers. In another embodiment, the controller 950 may generate a random set of bits based on the sequence of numbers output from the 3D QRNG which are sent to a computing device to which the device 900 is attached. The computing device may have its own software for using the random set of bits.

The detector 140 include three single photon detectors. The controller 950 may include software, hardware, firmware or a combination thereof to generate a graphical user interface to be displayed on a display device of a computing device to which the device 900 is attached. The GUI may assist in instructing the user to generate a quantum random number, a sequence of random numbers or a key that is sent to the computing device through the connector 959. The controller 950 may control the components of the 3D QRNG 110. For example, the user may send instructions to generate a key. The controller 950 may control the LED 120 to generate at least one photon. The controller 950 may receive power from a computing device and deliver power to the components within the housing 902 including the LED 120, the preparation stage 134, a measurement stage 136 and detector 140. The controller 950 may send other control signals the LED 120, the preparation stage 134, a measurement stage 136 and detector 140 to synchronize the operation of these components.

The terminology used herein is for the purpose of describing particular embodiments only and is not intended to be limiting. As used herein, the singular forms "a," "an," and "the" are intended to include the plural forms as well, unless the context clearly indicates otherwise. Furthermore, to the extent that the terms "including," "includes," "having," "has," "with," or variants thereof are used in either the detailed description and/or the claims, such terms are intended to be inclusive in a manner similar to the term "comprising." Moreover, unless specifically stated, any use of the terms first, second, etc., does not denote any order or importance, but rather the terms first, second, etc., are used to distinguish one element from another.

Unless otherwise defined, all terms (including technical and scientific terms) used herein have the same meaning as commonly understood by one of ordinary skill in the art to which embodiments of the invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

While various disclosed embodiments have been described above, it should be understood that they have been presented by way of example only, and not limitation. Numerous changes, omissions and/or additions to the subject matter disclosed herein can be made in accordance with the embodiments disclosed herein without departing from the spirit or scope of the embodiments. Also, equivalents may be substituted for elements thereof without departing from the spirit and scope of the embodiments. In addition, while a particular feature may have been disclosed with respect to only one of several implementations, such feature may be combined with one or more other features of the other implementations as may be desired and advantageous for any given or particular application. Furthermore, many modifications may be made to adapt a particular situation or material to the teachings of the embodiments without departing from the scope thereof.

Further, the purpose of the foregoing Abstract is to enable the U.S. Patent and Trademark Office and the public generally and especially the scientists, engineers and practitioners in the relevant art(s) who are not familiar with patent or legal terms or phraseology, to determine quickly from a cursory inspection the nature and essence of this technical disclosure. The Abstract is not intended to be limiting as to the scope of the present disclosure in any way.

Therefore, the breadth and scope of the subject matter provided herein should not be limited by any of the above explicitly described embodiments. Rather, the scope of the embodiments should be defined in accordance with the following claims and their equivalents.

We claim:

1. A universal interferometer for a three-dimensional quantum random number generator (3D QRNG), comprising:
    three input ports, each input port being configured to receive at least one prepared photon having three dimensions of quantum information in Hilbert space from a preparation stage of the 3D QRNG, the prepared photon is prepared based on a selected probability distribution set selected from probability distribution sets of p1, p2 and p3 that add to 1 and where the p1, the p2 and the p3 are rational numbers less than 1 and greater than zero;
    three two-dimensional (2D) interferometers connected and arranged to measure along an x-axis of a Cartesian coordinate standard system the prepared photon and preserving the three dimensions of the quantum information in the Hilbert space of the measured photon; and
    three output ports which produces the measured photon corresponding to a three-dimensional eigenstate.

2. The universal interferometer according to claim 1, further comprising:
    three interferometer paths, each path configured to generate a measured photon at one port of the three output ports according to the selected probability distribution set and the measured photon causes generation of a maximally unpredictable quantum random (QR) ternary digit, such that no single QR ternary digit can be predicted for any of the probability distribution sets.

3. The universal interferometer according to claim 1, wherein:
    the three input ports comprise first, second and third ports;
    the three output ports include first, second and third output ports; and
    the three 2D interferometers include first, second and third 2D interferometers; and further comprising:
    a first path connected between the first input port and the first output port, the first path having a first first-path phase adjuster connected to the first input port, the first 2D interferometer having a first input connected to the first-path phase adjuster and a second first-path phase adjuster connected to a first output of the first 2D interferometer;
    a second path connected between the second input port and the second output port and, the second path connecting the second input port to a second input of the first 2D interferometer and including a second-path phase adjuster connected to a second output of the first 2D interferometer; and
    a third path connected between the third input port and the third output port, the third path having a second 2D interferometer having a first input connected to the third input port and a second input connected to the second-path phase adjuster,
    wherein:
    the first path includes a third 2D interferometer having a first input coupled to the second first-path adjuster; and
    the third 2D interferometer having a second input coupled to the second 2D interferometer, a first output connected to the first output port, and a second output connected to the second output port.

4. The universal interferometer according to claim 3, wherein:
each of the first first-path phase adjuster and the second-path phase adjuster comprises a phase shifter of $\pi$; and
the second first-path phase adjuster comprises a phase shifter of $$-\frac{\pi}{2}.$$

5. The universal interferometer according to claim 4, wherein: the first 2D interferometer has a transmittance of $$\cos(-\eta/2) = -\arccos\left(\sqrt{\frac{2}{3}}\right);$$

the second 2D interferometer has a transmittance $$\cos\left(\frac{\pi}{3}\right);$$

and the third 2D interferometer has a transmittance $$\cos(\eta/2) = \arccos\left(\sqrt{\frac{2}{3}}\right).$$

6. The universal interferometer according to claim 3, wherein the first path, the second path and the third path are integrated into a single integrated circuit chip using complementary metal-oxide semiconductor techniques.

7. The universal interferometer according to claim 1, wherein the universal interferometer includes first, second and third interferometer paths defined by:

$$U_x = B^{-1}{}_{1,2} \cdot B_{2,3} \cdot D \cdot B_{1,2} = D' \cdot B'_{1,2} \cdot B_{2,3} \cdot B_{1,2}$$

where:
$U_x$ performs a measurement along an x-axis of a standard Cartesian coordinate system; and
$B_{1,2}$, $B_{2,3}$, $B^{-1}{}_{1,2}$ and D are matrices defined by:

$$B_{1,2} = \begin{pmatrix} \sqrt{\frac{2}{3}} & \frac{1}{\sqrt{3}} & 0 \\ \frac{i}{\sqrt{3}} & -i\sqrt{\frac{2}{3}} & 0 \\ 0 & 0 & 1 \end{pmatrix};$$

$$B_{2,3} = \begin{pmatrix} 1 & 0 & 0 \\ 0 & \frac{1}{2} & \frac{\sqrt{3}}{2} \\ 0 & \frac{\sqrt{3}}{2} & \frac{-1}{2} \end{pmatrix};$$

$$B^{-1}_{1,2} = \begin{pmatrix} \sqrt{\frac{2}{3}} & \frac{-i}{\sqrt{3}} & 0 \\ \frac{1}{\sqrt{3}} & i\sqrt{\frac{2}{3}} & 0 \\ 0 & 0 & 1 \end{pmatrix}; \text{ and}$$

$$D = \begin{pmatrix} 1 & 0 & 0 \\ 0 & -1 & 0 \\ 0 & 0 & -1 \end{pmatrix}; \text{ and}$$

where D' and $B'_{1,2}$ are matrices that are defined by:

$$D' = \begin{pmatrix} 1 & 0 & 0 \\ 0 & i & 0 \\ 0 & 0 & -1 \end{pmatrix}; \text{ and}$$

$$B'_{1,2} = \begin{pmatrix} \sqrt{\frac{2}{3}} & \frac{i}{\sqrt{3}} & 0 \\ -\frac{i}{\sqrt{3}} & -\sqrt{\frac{2}{3}} & 0 \\ 0 & 0 & 1 \end{pmatrix};$$

wherein each 2D interferometer of the three 2D interferometers is preceded by a phase adjuster to form a phase adjuster-interferometer pair, such that:
a first phase adjuster-interferometer pair is in the first path of the universal interferometer and defined by matrix $B'_{1,2}$;
a second phase adjuster-interferometer pair is in the third path of the universal interferometer and defined by $B_{2,3}$; and
a third phase adjuster-interferometer pair is in the first path of the universal interferometer and defined by matrix $B_{1,2}$.

8. The universal interferometer according to claim 7, wherein the three interferometer paths are simulated interferometer paths.

9. A method for measuring a photon by a universal interferometer for a three-dimensional quantum random number generator (3D QRNG), comprising:
receiving photons on at least one of three input ports of a universal interferometer, each input port being configured to receive a corresponding prepared photon having three dimensions of quantum information in Hilbert space from a preparation stage of the 3D QRNG, each corresponding prepared photon is prepared based on a selected probability distribution set selected from probability distribution sets of p1, p2 and p3 that add to 1 and where the p1, the p2 and the p3 are rational numbers less than 1 and greater than zero;
measuring, by three two-dimensional (2D) interferometers of the universal interferometer, along an x-axis of a Cartesian coordinate standard system the prepared photon and preserving the three dimensions of the quantum information in the Hilbert space of the measured photon; and
producing at one output port of three output ports of the universal interferometer the measured photon corresponding to a three-dimensional eigenstate.

10. The method according to claim 9, wherein the universal interferometer includes three paths with the three 2D interferometers connected and arranged; and the method further comprises:
generating, by each path, the measured photon at one of three output ports according to the selected probability distribution set and the measured photon causes generation of a maximally unpredictable quantum random (QR) ternary digit, such that no single QR ternary digit can be predicted for any of the probability distribution sets.

11. The method according to claim 9, wherein:
the three input ports comprise first, second and third ports;
the three output ports include first, second and third output ports; and the three 2D interferometers include first, second and
third 2D interferometers; and further comprising:
- a first path connected between the first input port and
  the first output port, the first path having a first
  first-path phase adjuster connected to the first input
  port, the first 2D interferometer having a first input
  connected to the first-path phase adjuster and a
  second first-path phase adjuster connected to a first
  output of the first 2D interferometer;
- a second path connected between the second input port
  and the second output port, and the second path
  connecting the second input port to a second input of
  the first 2D interferometer and including a second-
  path phase adjuster connected to a second output of
  the first 2D interferometer; and
- a third path connected between the third input port and
  the third output port, the third path having a second
  2D interferometer having a first input connected to
  the third input port and a second input connected to
  the second-path phase adjuster, wherein:
- the first path includes a third 2D interferometer having
  a first input coupled to the second first-path adjuster;
  and
- the third 2D interferometer having a second input
  coupled to the second 2D interferometer, a first
  output connected to the first output port, and a
  second output connected to the second output port;
  and the method further comprises:
- propagating a respective one photon received at the first
  input port through at least the first path and at least
  the first 2D interferometer and the third 2D interfer-
  ometer;
- propagating a respective second photon received at the
  second input port through at least the second path
  and the first, second and third 2D interferometers;
  and
- propagating a respective third photon received at the
  third input port through at least the third path and at
  least the second 2D interferometer.

12. The method according to claim 11, wherein:
each of the first first-path phase adjuster and the second-
path phase adjuster comprises a phase shifter of $\pi$;
the second first-path phase adjuster comprises a phase
shifter of $$-\frac{\pi}{2};$$

the first 2D interferometer has a transmittance of $$\cos(-\eta/2) = -\arccos\left(\sqrt{\frac{2}{3}}\right);$$

the second 2D interferometer has a transmittance $$\cos\left(\frac{\pi}{3}\right);$$

and
the third 2D interferometer has a transmittance $$\cos(\eta/2) = \arccos\left(\sqrt{\frac{2}{3}}\right).$$

13. The method according to claim 9, wherein the uni-
versal interferometer is integrated into a single integrated
circuit chip using complementary metal-oxide semiconduc-
tor techniques; and the method further comprises:
controlling, by a processor, the universal interferometer to
receive the photons.

14. The method according to claim 11, wherein the
universal interferometer includes first, second and third
interferometer paths defined by:

$$U_x = B^{-1}_{1,2} \cdot B_{2,3} D \cdot B_{1,2} = D' \cdot B'_{1,2} \cdot B_{2,3} \cdot B_{1,2}$$

where:
Ux performs the measurement along an x-axis of a
standard Cartesian coordinate system; and
$B_{1,2}$, $B_{2,3}$, $B^{-1}_{1,2}$ and D are matrices defined by:

$$B_{1,2} = \begin{pmatrix} \sqrt{\frac{2}{3}} & \frac{1}{\sqrt{3}} & 0 \\ \frac{i}{\sqrt{3}} & -i\sqrt{\frac{2}{3}} & 0 \\ 0 & 0 & 1 \end{pmatrix};$$

$$B_{2,3} = \begin{pmatrix} 1 & 0 & 0 \\ 0 & \frac{1}{2} & \frac{\sqrt{3}}{2} \\ 0 & \frac{\sqrt{3}}{2} & \frac{-1}{2} \end{pmatrix};$$

$$B^{-1}_{1,2} = \begin{pmatrix} \sqrt{\frac{2}{3}} & \frac{-i}{\sqrt{3}} & 0 \\ \frac{1}{\sqrt{3}} & i\sqrt{\frac{2}{3}} & 0 \\ 0 & 0 & 1 \end{pmatrix}; \text{ and}$$

$$D = \begin{pmatrix} 1 & 0 & 0 \\ 0 & -1 & 0 \\ 0 & 0 & -1 \end{pmatrix}; \text{ and}$$

where D' and $B'_{1,2}$ are matrices that are defined by:

$$D' = \begin{pmatrix} 1 & 0 & 0 \\ 0 & i & 0 \\ 0 & 0 & -1 \end{pmatrix}; \text{ and}$$

$$B'_{1,2} = \begin{pmatrix} \sqrt{\frac{2}{3}} & \frac{i}{\sqrt{3}} & 0 \\ -\frac{i}{\sqrt{3}} & -\sqrt{\frac{2}{3}} & 0 \\ 0 & 0 & 1 \end{pmatrix}; \text{ and}$$

wherein each 2D interferometer of the three 2D interfer-
ometers is preceded by a phase adjuster to form a phase
adjuster-interferometer pair; and
wherein the measuring, by the three 2D interferometers of
the universal interferometer, comprises:
measuring by a first phase adjuster-interferometer pair
is in the first path of the universal interferometer
defined by matrix $B'_{1,2}$;

measuring by a second phase adjuster-interferometer pair is in the third path of the universal interferometer and defined by $B_{2,3}$; and measuring by a third phase adjuster-interferometer pair is in the first path of the universal interferometer and defined by matrix $B_{1,2}$.

15. The method according to claim 9, further comprising:
blocking input of the prepared photon to a second input port and a third input port of the three input ports.

16. A system comprising:
a three-dimensional quantum random number generator (3D QRNG), the 3D QRNG comprises a universal interferometer of claim 1.

17. The system according to claim 16, wherein the universal interferometer is integrated into a single integrated circuit chip using complementary metal-oxide semiconductor techniques.

18. The system according to claim 16, wherein the 3D QRNG comprises a photon source comprising silicon photonics integrated into an integrated circuit chip using semiconductor manufacturing techniques.

19. The system according to claim 16, wherein the 3D QRNG further comprises:
a preparation stage coupled to the three input ports, the preparation stage comprises at one of a beamsplitter assembly or another interferometer.

20. The system according to claim 19, wherein the 3D QRNG is integrated into a single integrated circuit chip using complementary metal-oxide semiconductor techniques.

* * * * *